(12) United States Patent
Kleinemolen et al.

(10) Patent No.: US 12,544,751 B2
(45) Date of Patent: Feb. 10, 2026

(54) ASSAY DEVICE AND METHOD OF USE THEREOF

(71) Applicant: Truvian Sciences, Inc., San Diego, CA (US)

(72) Inventors: Ian Kleinemolen, San Diego, CA (US); Armando Tovar, San Diego, CA (US); Jeffrey Hawkins, San Diego, CA (US); Florence Ying Lee, San Diego, CA (US); Peter R. Delmenico, San Diego, CA (US); Dena Marrinucci, San Diego, CA (US)

(73) Assignee: Truvian Sciences, Inc., San Diego, CA (US)

( * ) Notice: Subject to any disclaimer, the term of this patent is extended or adjusted under 35 U.S.C. 154(b) by 1015 days.

(21) Appl. No.: 17/433,400

(22) PCT Filed: Feb. 26, 2020

(86) PCT No.: PCT/US2020/019875
§ 371 (c)(1),
(2) Date: Aug. 24, 2021

(87) PCT Pub. No.: WO2020/176607
PCT Pub. Date: Sep. 3, 2020

(65) Prior Publication Data
US 2022/0088583 A1    Mar. 24, 2022

Related U.S. Application Data

(60) Provisional application No. 62/810,857, filed on Feb. 26, 2019.

(51) Int. Cl.
*B01L 3/00*    (2006.01)
*G01N 15/01*    (2024.01)
(Continued)

(52) U.S. Cl.
CPC .......... *B01L 3/502* (2013.01); *G01N 15/1459* (2013.01); *G01N 33/80* (2013.01);
(Continued)

(58) Field of Classification Search
CPC ............... B01L 3/502; B01L 2200/026; B01L 2200/0647; B01L 2200/0684;
(Continued)

(56) References Cited

U.S. PATENT DOCUMENTS 6,637,463 B1    10/2003    Lei et al.
6,819,408 B1 *    11/2004    Scrivens ............ G01N 15/0625
                                                           422/527
(Continued)

FOREIGN PATENT DOCUMENTS

EP             1542010 A1    6/2005
WO    WO 2005/119211 A1    12/2005
WO       2020227643 A1    11/2020

OTHER PUBLICATIONS

CA: Office Action issued in Canadian Patent Application No. 3131245 dated Jun. 4, 2024 (10 pages).
(Continued)

*Primary Examiner* — Jill A Warden
*Assistant Examiner* — Alex Ramirez
(74) *Attorney, Agent, or Firm* — Snell & Wilmer, L.L.P.; April Wurster

(57) ABSTRACT

An assay device as well as a method of use thereof is described. The assay device includes a planar substrate having a top surface and a bottom surface. The assay device further includes one or more flow channels disposed within the planar substrate and extending along a dimension of the planar substrate between the top surface and the bottom surface. The assay device further includes an inlet fluidly coupled to the one or more flow channels and one or more
(Continued)

vents fluidly coupled to the one or more channels which are operable to facilitate flow of a liquid sample, such as whole blood through the one or more channels. The one or more flow channels are configured to receive a liquid sample from the inlet and allow flow of the liquid sample.

26 Claims, 21 Drawing Sheets

(51) Int. Cl.
  *G01N 15/10* (2024.01)
  *G01N 15/14* (2024.01)
  *G01N 33/80* (2006.01)

(52) U.S. Cl.
  CPC . *B01L 2200/026* (2013.01); *B01L 2200/0647* (2013.01); *B01L 2200/0684* (2013.01); *B01L 2200/10* (2013.01); *B01L 2200/12* (2013.01); *B01L 2300/0663* (2013.01); *B01L 2300/12* (2013.01); *B01L 2300/161* (2013.01); *G01N 2015/012* (2024.01); *G01N 2015/016* (2024.01); *G01N 2015/018* (2024.01); *G01N 2015/1006* (2013.01); *G01N 2015/1486* (2013.01)

(58) Field of Classification Search
  CPC ............. B01L 2200/10; B01L 2200/12; B01L 2300/0663; B01L 2300/12; B01L 2300/161; G01N 15/1459; G01N 33/80; G01N 2015/016; G01N 2015/018; G01N 2015/012; G01N 2015/1006; G01N 2015/1486
  See application file for complete search history.

(56) References Cited

U.S. PATENT DOCUMENTS

| | | | |
|---|---|---|---|
| 7,736,890 | B2 | 6/2010 | Sia et al. |
| 9,470,609 | B2 | 10/2016 | Wimberger-Friedl et al. |
| D936,856 | S | 11/2021 | Hawkins et al. |
| D954,295 | S | 6/2022 | Hawkins et al. |
| D959,019 | S | 7/2022 | Hawkins et al. |
| D960,386 | S | 8/2022 | Hawkins et al. |
| D968,643 | S | 11/2022 | Hawkins et al. |
| 11,638,918 | B2 | 5/2023 | Kleinemolen et al. |
| 2003/0044992 | A1 | 3/2003 | Chao et al. |
| 2005/0003939 | A1 | 1/2005 | Womer et al. |
| 2005/0229696 | A1* | 10/2005 | Takayama ............ B01F 25/4338 73/204.26 |
| 2006/0223166 | A1* | 10/2006 | Wilding ............... B01J 19/0093 435/7.1 |
| 2007/0298433 | A1 | 12/2007 | Sia et al. |
| 2012/0225446 | A1* | 9/2012 | Wimberger-Friedl ....................... B01L 3/5025 29/592 |
| 2016/0038940 | A1* | 2/2016 | Babcock ........... B01L 3/502707 422/68.1 |
| 2019/0086324 | A1 | 3/2019 | Marrinucci et al. |
| 2020/0064254 | A1 | 2/2020 | Vanderklein et al. |
| 2021/0011001 | A1 | 1/2021 | Chou et al. |

OTHER PUBLICATIONS

CA: Office Action issued in Canadian Patent Application No. 3131245 dated Sep. 19, 2023 (12 pages).

Hawkins, "Rethinking the Clinical Laboratory Test Value Chain: Using New Technologies and New Approaches to Lower Costs, Speed Time-to-Answer, and Contribute to Improved Patient Outcomes," Truvian Slide Deck pp. 1-19 (Apr. 27, 2021).

Olanrewaju et al., "Capillary microfluidics in microchannels: from microfluidic networks to capillaric circuits", Lab on a Chip, 18, pp. 2315-2478 (2018) Available on the Internet at URL: https://pubs.rsc.org/en/content/articlelanding/2018/lc/c8lc00458g.

Theranos' Elizabeth Holmes Speaks at AACC Meeting. "Theranos Science & Technology: The Miniaturization of Laboratory Testing," American Association for Clinical Chemistry [Video] [Screen captures from video retrieved on the Internet at URL: https://www.mpo-mag.com/contents/view_videos/2016-08-02/theranos-elizabeth-holmes-speaks-at-aacc-meeting/] pp. 1-6 (Aug. 2, 2016).

Zhang et al., "A simple statistical parameter for use in evaluation and validation of high throughput screening assays" Journal of Biomolecular Screening 4:67-73 (1999).

"Red Blood Cell," *Wikipedia* (Retrieved from the Internet on Jun. 11, 2020 at https://en.wikipedia.org/wiki/Red_blood_cell) (1987), p. 4.

EP Extended Search Report in European U.S. Appl. No. 20/762,403, dated Nov. 22, 2022, 7 pages.

WO: International Search Report and Written Opinion for PCT/US2024/042932 dated Dec. 10, 2024; 15 pages.

WO: International Search Report and Written Opinion for PCT/US2020/19875 dated Jun. 26, 2020 (13 pages).

* cited by examiner

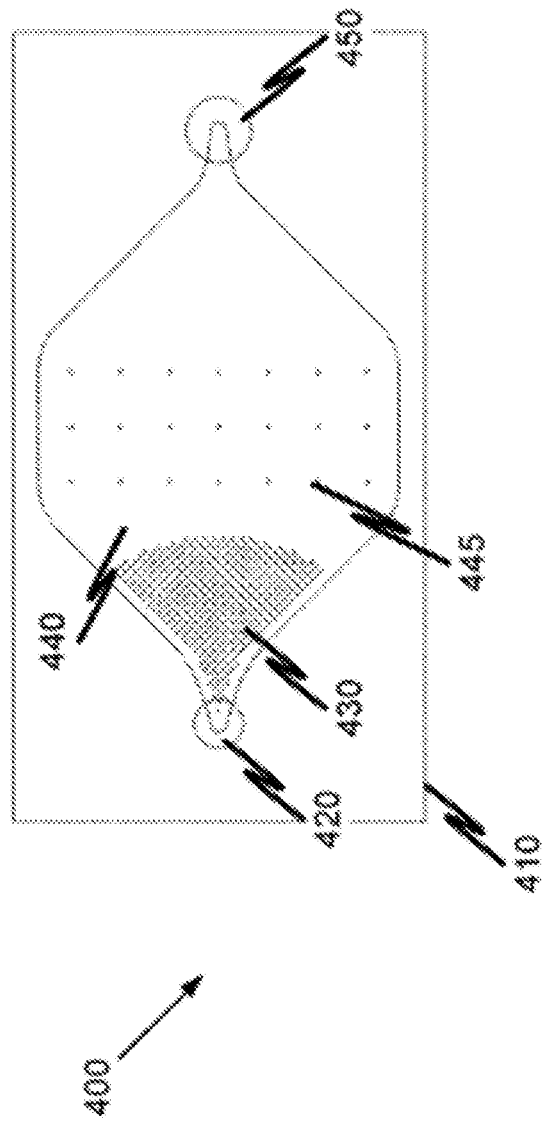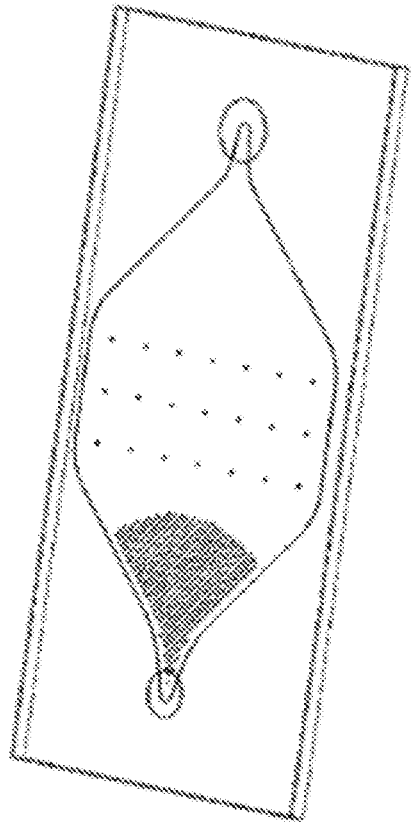
FIGURE 13A
FIGURE 13B

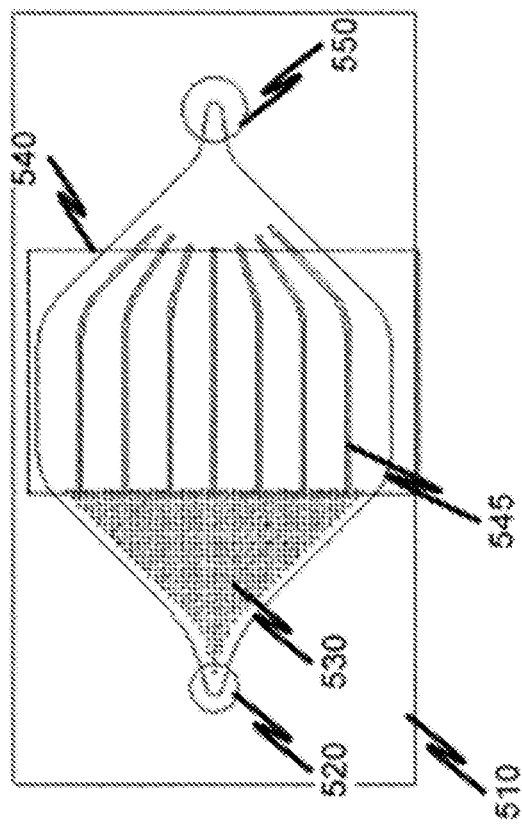
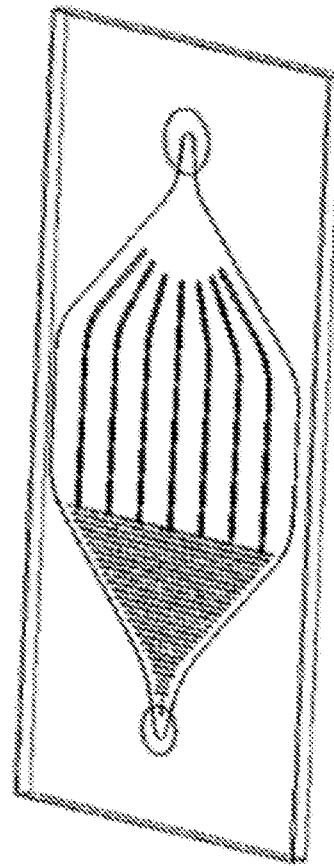
FIGURE 14A
FIGURE 14B

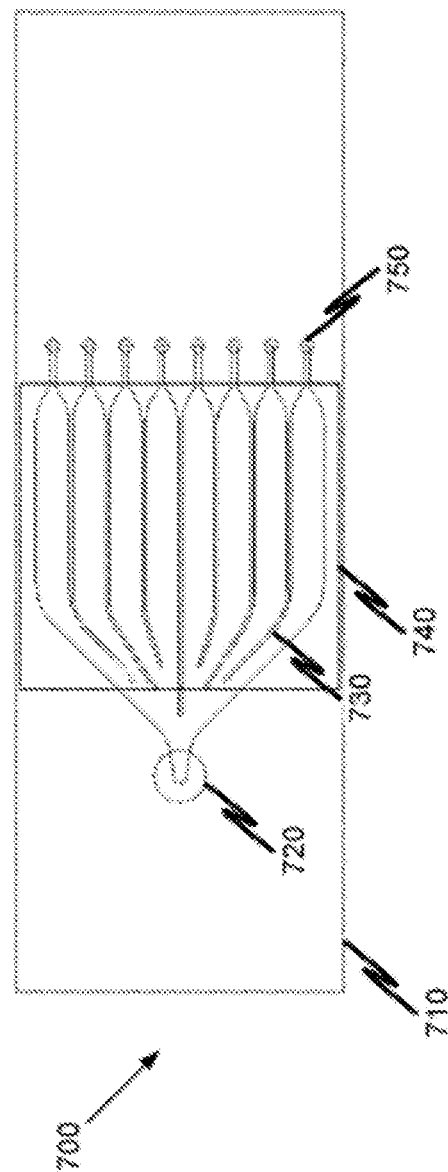
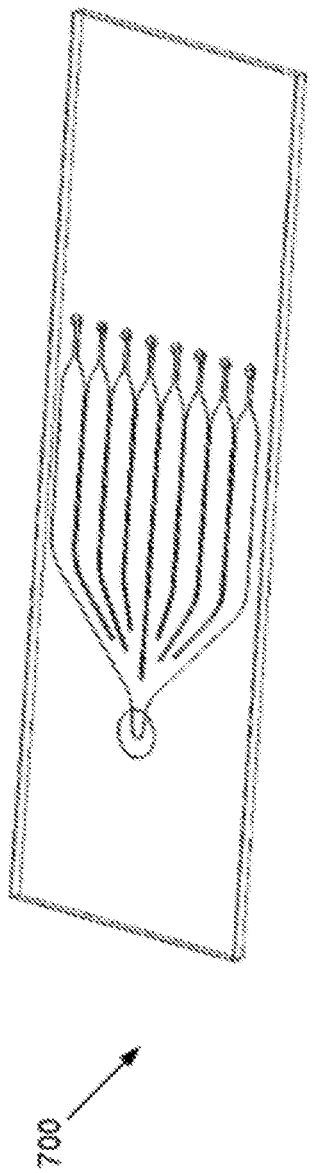
FIGURE 16A
FIGURE 16B

ASSAY DEVICE AND METHOD OF USE THEREOF

CROSS-REFERENCE TO RELATED APPLICATIONS

This application is a 35 USC § 371 National Stage application of International Application No. PCT/US2020/019875 filed Feb. 26, 2020, now pending; which claims the benefit under 35 USC § 119(e) to U.S. Application Ser. No. 62/810,857 filed Feb. 26, 2019. The disclosure of each of the prior applications is considered part of and is incorporated by reference in the disclosure of this application.

BACKGROUND OF THE DISCLOSURE

Field

The invention of the present disclosure relates generally to diagnostics and more specifically to devices for characterization of a whole blood sample as well as related methods for using and manufacturing such devices.

Background Information

Counting of whole blood components, e.g., red blood cells, white blood cells, and platelets, is important for diagnosing diseases and/or other medical issues. Automated counting of blood cells can be achieved by taking images of a whole blood sample and processing and analyzing the images. Accuracy of the automated counting can depend directly on a quality, e.g., consistency and/or reliability, of data captured by the images. The quality of the data may further depend on a quality, e.g., uniformity, of the whole blood sample. Entrapment of air bubbles within the whole blood sample or stacking of the blood cells, for example, can degrade the uniformity of the whole blood sample.

SUMMARY

In various embodiments, the present disclosure provides an assay device. The assay device includes a planar substrate having a top surface and a bottom surface. The assay device further includes one or more flow channels disposed within the planar substrate and extending along a dimension of the planar substrate between the top surface and the bottom surface. The assay device further includes an inlet fluidly coupled to the one or more flow channels and one or more vents fluidly coupled to the one or more channels which are operable to facilitate flow of a liquid sample, such as whole blood through the one or more channels. The one or more flow channels are configured to receive a liquid sample from the inlet and allow flow of the liquid sample within the one more channels whereby analytes of the liquid sample are distributed within the one or more channels as a monolayer.

In another embodiment, the assay device includes a planar slide having a top surface. The assay device further includes an inlet disposed on the top surface and configured to receive a liquid sample, such as whole blood including red blood cells, white blood cells, and platelets. The assay device further includes one or more channels fluidly coupled to the inlet and extending along the top surface that are configured to receive and spread the liquid sample across an imaging area within the one or more channels such that there is a monolayer of components in the liquid sample within the imaging area. The assay device further includes a cover overlaying at least a portion of the imaging area. The assay device further includes one or more vents extending from the top surface to the one or more channels and configured to facilitate flow of the liquid sample through the one or more channels. The one or more channels and the cover in combination are configured to control a depth of the monolayer.

In still another embodiment, a method for conducting an assay using an assay device as described herein is provided. The method includes depositing a liquid sample, such as whole blood into the inlet of the assay device. The method further includes allowing the liquid sample to fill one or more flow channels thereby distributing one or more analytes present in the liquid sample throughout the flow channel and generating a monolayer of the one or more analytes within the one or more flow channels. The one or more analytes within the one or more flow channels are then detected and subsequently analyzed.

In yet another embodiment, the present disclosure provides a method for using an assay device as described herein. The method includes depositing a liquid sample into an inlet of the assay device. The method further includes imaging an imaging area of the assay device which includes a monolayer of components present in the liquid sample. Components of the liquid sample, such as whole blood including red blood cells, white blood cells, platelets, or other analytes are characterized based on the imaging.

In another embodiment, the disclosure provides a method of assembling an assay device as described herein. The method includes forming in a planar substrate having a top surface and a bottom surface: (i) a flow channel disposed within the planar substrate and extending along a dimension of the planar substrate between the top surface and the bottom surface; (ii) an inlet fluidly coupled to the flow channel; and (iii) a vent fluidly coupled to the channel and operable to facilitate flow of a liquid sample through the channel. The method further includes treating at least one surface of the flow channel to increase an amount of hydrophilicity of the at least one surface.

In another embodiment of assembling an assay device as described herein, the method includes forming an inlet on a top surface of a planar slide. The inlet is configured to receive a liquid sample, such as whole blood including red blood cells, white blood cells, platelets or other analytes. One or more channels are formed on the top surface. The one or more channels are fluidly coupled to the inlet and extend along the top surface. The one or more channels are configured to receive and spread components of the liquid sample across an imaging area within the one or more channels such that there is a monolayer of the components within the imaging area. One or more vents extend from the top surface to the one or more channels and are configured to facilitate a flow of the liquid sample through the one or more channels. At least one of the planar slide or a cover is treated to increase an amount of hydrophilicity of the planar slide or the cover. The cover is bonded to the planar slide such that the cover overlays at least a portion of the imaging area. The one or more channels and the cover in combination are configured to control a depth of the monolayer.

In still another embodiment, the disclosure provides an automated system for performing an assay. The system includes an assay device as described herein and a detection module. The detection module may include an imager and optionally a processing device, wherein (i) the imager images the assay device; and (ii) the processing device processes one or more images obtained by the imager and analyzes an analyte.

BRIEF DESCRIPTION OF THE FIGURES

FIGS. 13A and 13B are a top-down view and a perspective view, respectively, of an assay device having pluralities of posts in one embodiment of the disclosure.

FIGS. 14A and 14B are a top-down view and a perspective view, respectively, of an assay device having posts, ridges, and channels in one embodiment of the disclosure.

FIGS. 16A and 16B are a top-down view and a perspective view, respectively, of an assay device having a plurality of ridges and a plurality of vents with capillary stop structures in one embodiment of the disclosure.

DETAILED DESCRIPTION

Figure 1:
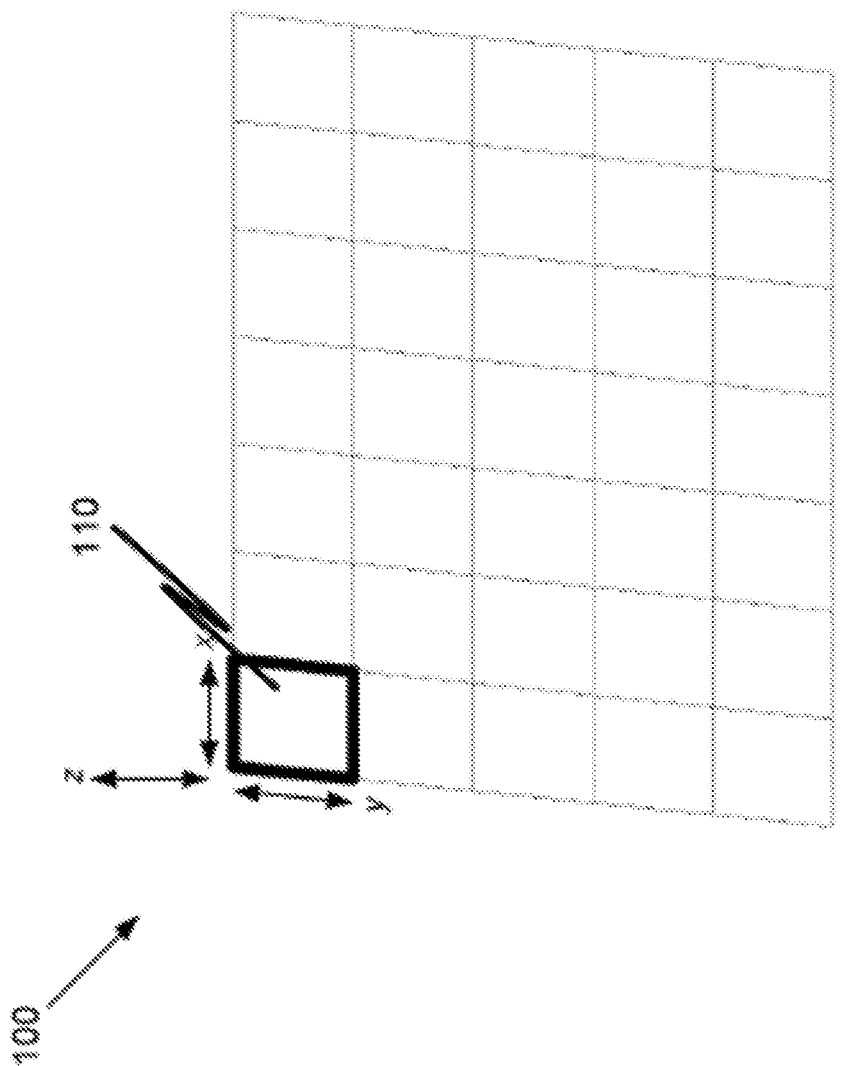
FIG. 1 is a perspective view of an imaging area in a system configured to capture images of a liquid sample in an assay device.

Generating a "monolayer," e.g., a single layer of components of a liquid sample can facilitate detection of analytes present in the sample. For example, generating a monolayer of components of a whole blood sample can facilitate imaging and counting of cellular components, e.g., red blood cells, white blood cells, and platelets, within the whole blood sample.

Accordingly, an assay device as provided herein can be used to receive a liquid sample and generate a monolayer of components of one or more analytes present in the liquid sample. For example, an assay device of as provided herein can receive a whole blood sample, optionally at a specified dilution and generate a monolayer of cells for imaging. To further facilitate image analysis of the cellular components, the whole blood sample may be stained with a fluorescent dye or processed in another way prior to input into the assay device.

In embodiments, a shape and a connectivity of components within the assay device can control a depth and a flow of the liquid sample. As one example, the shape and connectivity of components can yield a tightly controlled depth of the liquid sample, such detection can be made of a monolayer having a constant dimension in a z direction. As another example, the shape and the connectivity of components can reduce an entrapment of air bubbles within the liquid sample.

In embodiments, a shape and a connectivity of components within the assay device can control a depth and a flow of the whole blood sample, thereby mitigating problems seen with traditional blood characterization devices and methods. As one example, the shape and connectivity of components can yield a tightly controlled depth of the whole blood sample, such that an imaging system can assume a constant dimension in a z direction while the imaging is performed in x and y directions. As another example, the shape and the connectivity of components can reduce an entrapment of air bubbles within the whole blood sample.

A flow rate of the whole blood sample can depend on a surface treatment of the components in the assay device as well as the shape, dimension and the connectivity of the components. By controlling the flow rate, bubble formation in the monolayer can be reduced. In embodiments, the device is configured for flow rates ranging from about 25 μL/min up to 2000 μl/min. The assay device described herein can be used in connection with point of care (POC) systems and enable comprehensive blood testing comprising chemistries, immunoassays, and hematology assays using a small sample of blood. Results can be produced on site and delivered to patients within minutes.

In embodiments, the assay device described herein is used in connection with a system for performing multianalyte detection as described in U.S. Patent Application Publication No. 2019/0086324 the entire contents of which is incorporated herein by reference in its entirety. In embodiments, the assay device can be placed in a consumable support pack of the detection system prior to performing the imaging and subsequently analyzed via functionality of the detection system. In embodiments, the consumable support pack can be configured to move in at least one dimension. The assay device described herein may be combined with one or more different assay modalities, such as a biochemical assay and/or a fluorescent based assay.

Assay Device

FIG. 1 depicts a perspective view of an imaging area 100 in a system configured to capture images of a whole blood sample in an assay device. The imaging area 100, which corresponds to a large parallelogram, includes a plurality of smaller parallelograms, that correspond to a field of view (FOV) 110 of imaging equipment. The FOV 110 is two-dimensional and includes the x and y directions. The z direction represents a depth of the whole blood sample being imaged. In one variation, the imaging equipment moves in the x direction, and the assay device moves in the y direction. In another variation, the imaging equipment is stationary while the assay device moves in both the x and the y directions. In yet another variation, the imaging equipment moves in both the x and the y directions while the assay device is stationary.

An imaging area can be about 50, 100, 200, 300, 400, 500, 600, 700, 800, 900, 1000 square millimeters or greater. Dimensions for an FOV 110 can include about 0.7 millimeters in the y direction and 0.5 millimeters in the x direction. Each image can be correlated to a volume of liquid. Thus, if the whole blood sample within the imaging area has a tightly controlled depth in the z direction, a volume that corresponds to each FOV 110 can be readily calculated. For reference, an FOV that is 0.7 millimeters by 0.5 millimeters with a depth of between 0.1 and 0.15 millimeters can include on the order of 1, 100, 1000, 5000 or 10,000 red blood cells for a diluted whole blood sample and can include on the order of 50,000, 100,000 or 150,000 red blood cells for an undiluted whole blood sample.

In embodiments, an FOV has a depth between about 0.02 and 0.25 millimeters, including about 0.02, 0.03, 0.04, 0.05, 0.06, 0.08, 0.09, 0.1, 0.11, 0.12, 0.13, 0.14, 0.15, 0.16, 0.17, 0.18, 0.19, 0.20, 0.21, 0.22, 0.23, 0.24 and 0.25 millimeters. In embodiments, an FOV has a depth between about 0.08 and 0.12 millimeters, including about 0.08, 0.09, 0.1, 0.11 and 0.12 millimeters.

As will be appreciated by one in the art, the number of cells present in a given FOV is not only dependent on the dimensions of the FOV, but also dilution of the original sample if performed. In embodiments, an FOV includes at least about 1 to 5000 cells, including 1, 10, 50, 100, 500, 1000, 1500, 2000, 2500, 3000, 3500, 4000, 4500 or 5000 cells, such as blood cells including red blood cells, white blood cells and/or platelets.

The whole blood sample in the assay device can be imaged with fluorescence microscopy, bright-field microscopy, back-scattering darkfield microscopy, epi-fluorescence microscopy, interference reflection contrast microscopy, darkfield surface reflection microscopy, phase contrast microscopy or other optical techniques. A magnification and numerical aperture, such as 5×, 10×, 20×, 30×, 40×, 50×, 10×, 70×, 80×, 90×, 100×, 110×, 120×, 130×, 140×, 150×, or 200× magnification and between about 0.5 to 1.0, 1.1, 1.2, 1.3, 1.4, 1.5, 1.6, 1.7, 1.8, 1.9 or 2.0 NA, can be used to resolve cell morphology. In one embodiment, a magnification of 20λ and a numerical aperture of 0.75 NA can be used to resolve cell morphology. Other optical settings, including higher and lower magnification and resolution can be used, depending on a target hematology assay.

In various embodiments, an assay device of the present disclosure is operable to perform a target hematology assay including, but not limited to, any of a hematocrit determination, a red blood cell count, a platelet count, a white blood cell count, or a white blood cell differential.

In one embodiment, the imaging equipment can move in the x direction, across a row of images. The assay device can move in the y direction, and the imaging equipment can move in the x direction across a second row of images. The imaging equipment images each FOV 110 until the entire imaging area 100 has been imaged. The images can be stitched together to form a larger image. Alternatively, the images can overlap, and the overlapping portions, i.e., edges, can be discarded.

It is to be noted that while this disclosure illustrates use of imaging to detect an analyte in a liquid sample, other types of detection methods may be utilized in addition to imaging or in the alternative.

Figure 2:
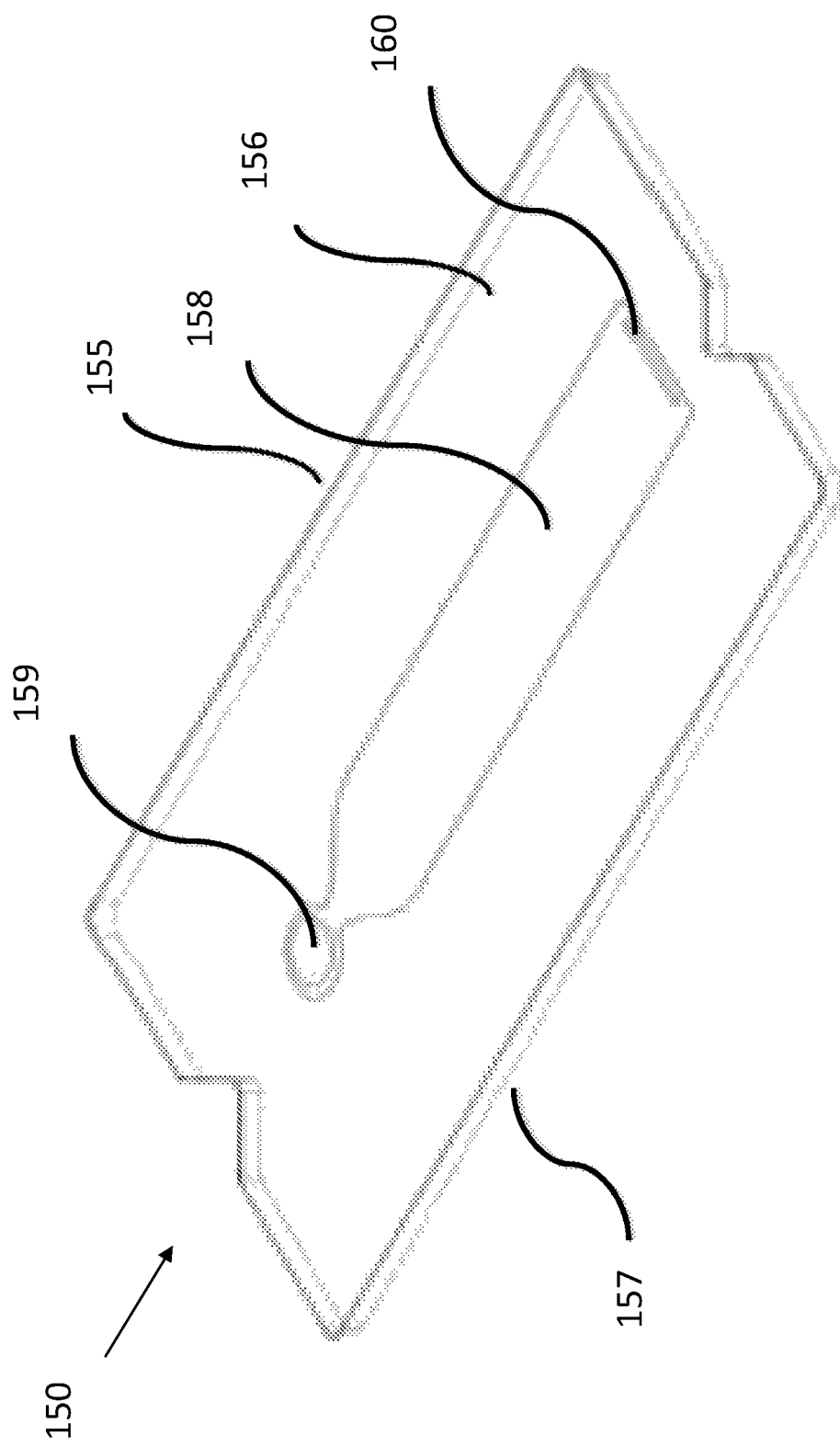
FIG. 2 is a perspective view of an assay device having a single flow channel in one embodiment of the disclosure.

FIG. 2 is an assay device 150 including a planar substrate 155 having a top surface 156 and a bottom surface 157. The assay device is substantially flat. The assay device further includes a flow channel 158 disposed within the planar substrate 155 and extending along a dimension of the planar substrate 155 between the top surface 156 and the bottom surface 157. The assay device further includes an inlet 159 fluidly coupled to the flow channel 158 and a vent 160 fluidly coupled to the flow channel 158 which is operable to facilitate flow of a liquid sample, such as whole blood through the flow channel 158. The flow channel 158 is configured to receive a liquid sample deposited into the inlet 159 and allow flow of the liquid sample within the flow channel 158 toward the vent 160 whereby analytes of the liquid sample are distributed within flow channel 158. In one embodiment, the analytes are distributed within the flow channel 158 as a monolayer.

In embodiments, all or a portion of the top surface 156 can be transparent or semitransparent and/or fluorescent to facilitate detection of analytes, for example by imaging. The assay device 150 can be imaged from the top. An imaging area, e.g., imaging area 100, can coincide with a portion of the assay device.

The planar substrate 155 has a length L, a width W and a thickness T. The dimension of the length L and the width W may be the same or the dimension of the length L may be greater than the width W. The dimension of the thickness T is smaller than the dimension of the length L and the width W.

In various embodiments, the assay device may include a plurality of flow channels. For example, the assay device may include 2, 3, 4, 5, 6, 7, 8, 9, 10, 11, 12, 13, 14, 15, 16, 17, 18, 19, 20 or more flow channels. The flow channels may be arranged on the planar substrate in any number of configurations with respect to one another. For example, the longitudinal axis of each flow channel may be arranged in parallel and extend along the length L of the planar substrate. Alternatively, the flow channels may be arranged in a radial manner extending from a central inlet in a spoke fashion. Alternatively, the flow channels may be arranged in a "binary tree" configuration as detailed in this disclosure.

In various embodiments, each flow channel is fluidly coupled to a single inlet and a single vent wherein the inlet and the vent is not shared by another flow channel. In alternative embodiments, multiple flow channels share a single inlet and each flow channel is fluidly coupled to a different unshared vent. In alternative embodiments, multiple flow channels share a single vent and each flow channel is fluidly coupled to a different unshared inlet.

In various embodiments, the assay device may include a plurality of vents, each being fluidly coupled to a single flow channel or a plurality of flow channels. In embodiments, a flow channel is fluidly coupled to a single vent. In alternative embodiments, a flow channel is fluidly coupled to 2, 3, 4, 5, 6, 7, 8, 9, 10 or more vents.

A vent of the assay device may be disposed on the planar substrate in various locations. For example, a vent may be disposed in the top surface or the bottom surface of the planar substrate. Alternatively, a vent may be disposed on a side of the assay device, for example between the top surface and the bottom surface and aligned perpendicular to the thickness T of the planar substrate.

Figure 3:
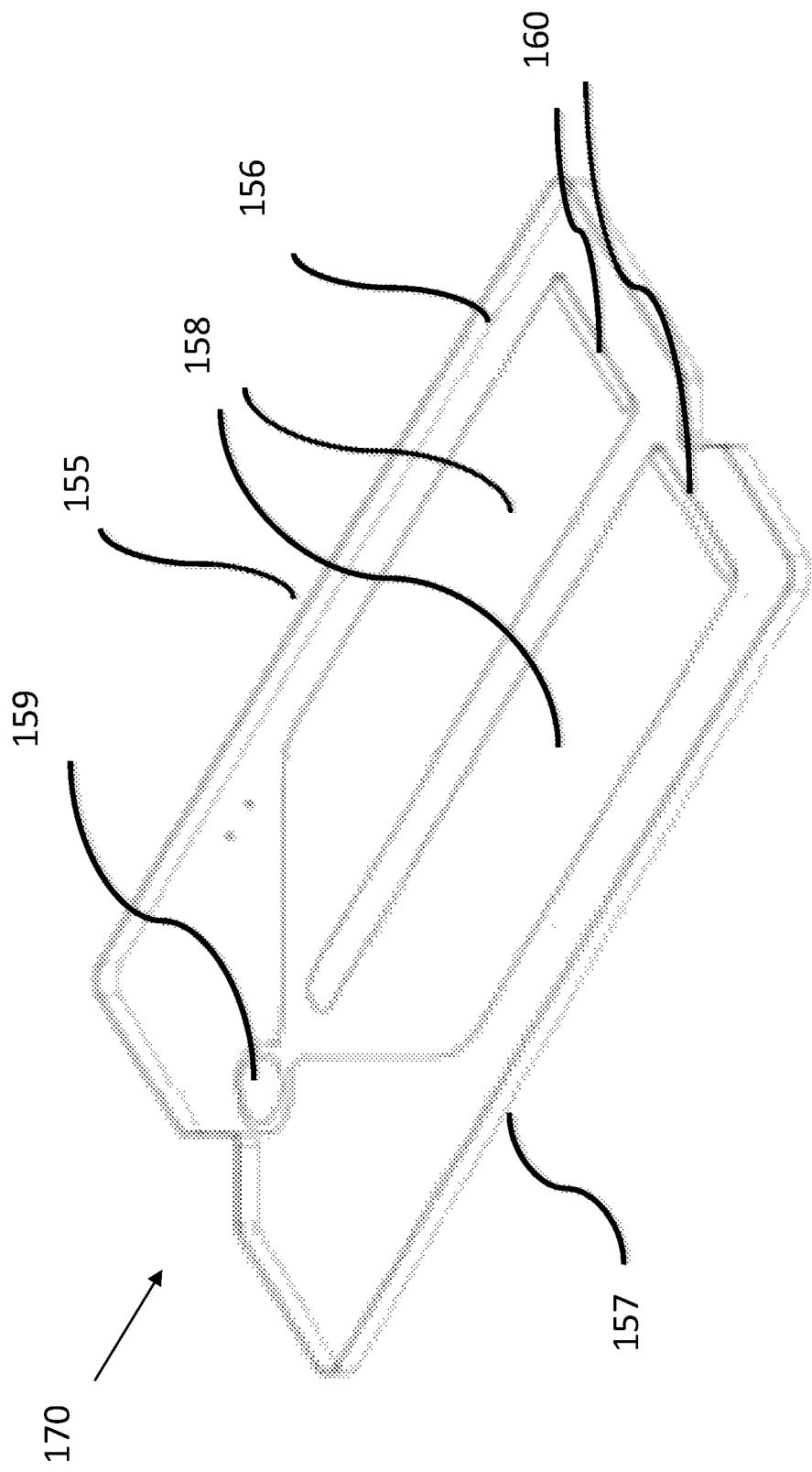
FIG. 3 is a perspective view of an assay device having two flow channels in one embodiment of the disclosure.
Figure 4A:
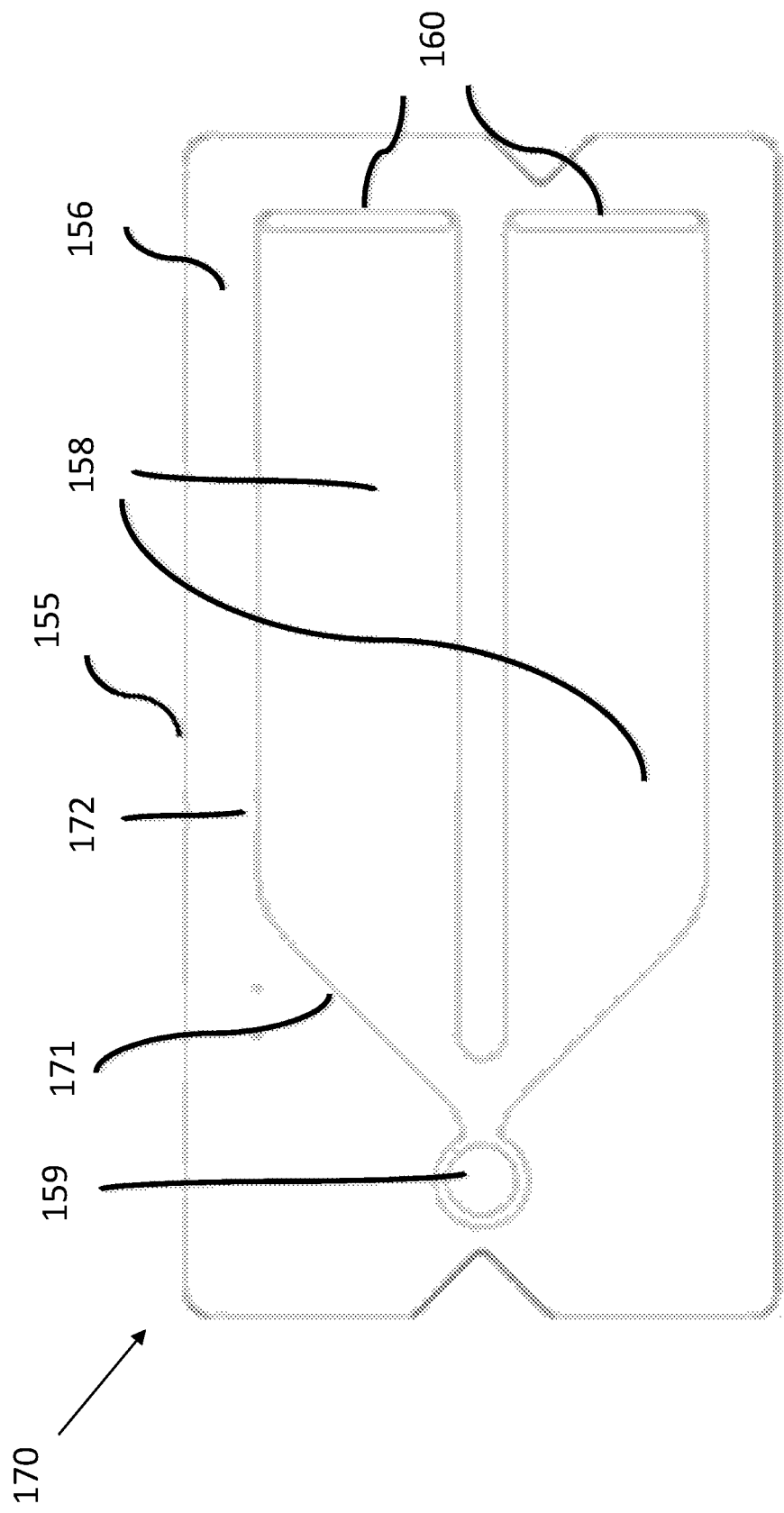
FIGS. 4A and 4B are a top-down view and a cross-sectional view, respectively, of the assay device depicted in FIG. 3.
Figure 4B:
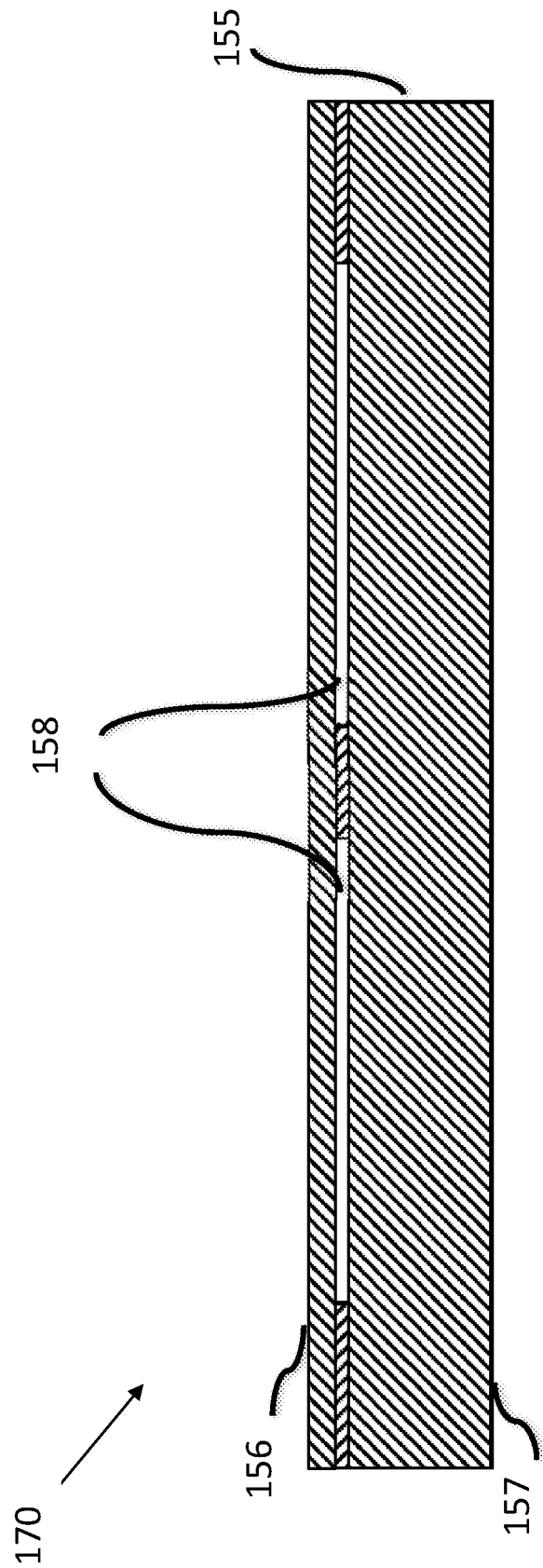

FIGS. 3 and 4A-4B depict an assay device 170 having 2 flow channels 158 in which both flow channels 158 share a single inlet 159 and have different vents 160.

Figure 5:
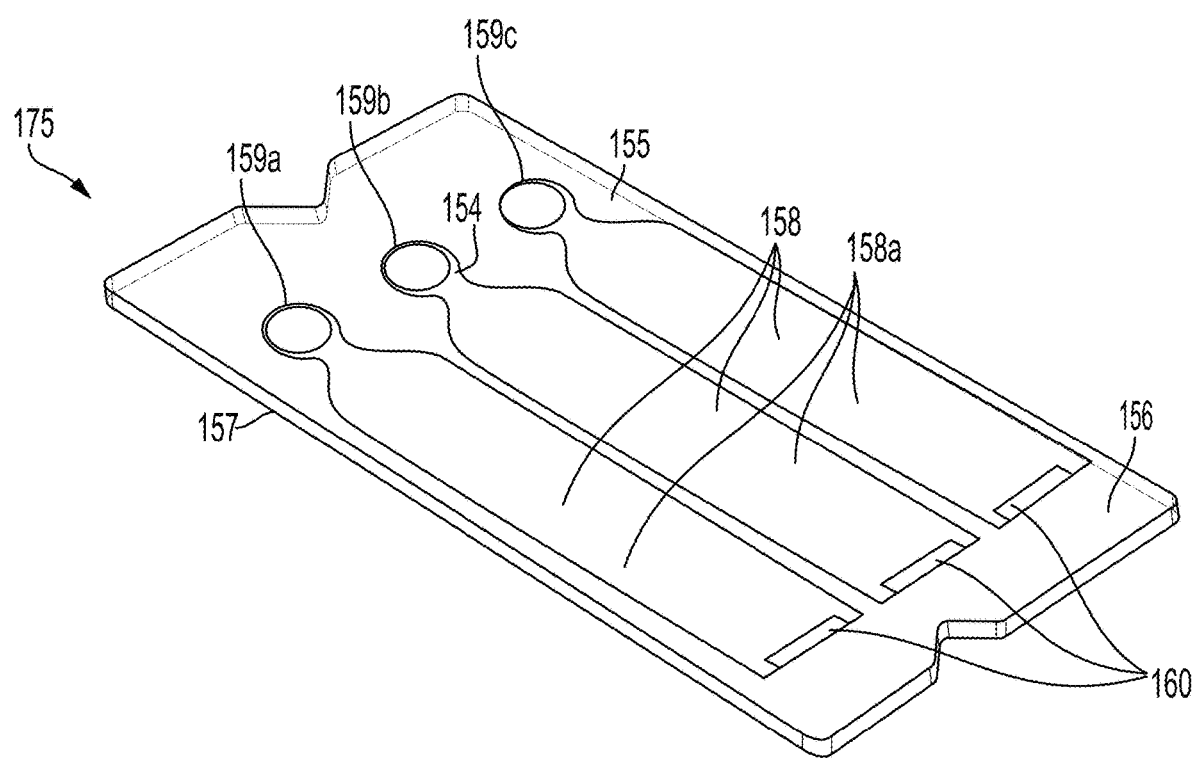
FIG. 5 is a perspective view of an assay device having three flow channels 158 and three imaging areas 158a in one embodiment of the disclosure showing one or more inlets 159a, 159b, and 159c, as well as a bevel feature, 154.

FIG. 5 depicts an assay device 175 having three flow channels 158, each having an unshared inlet 159 and an unshared vent 160.

Figure 9:
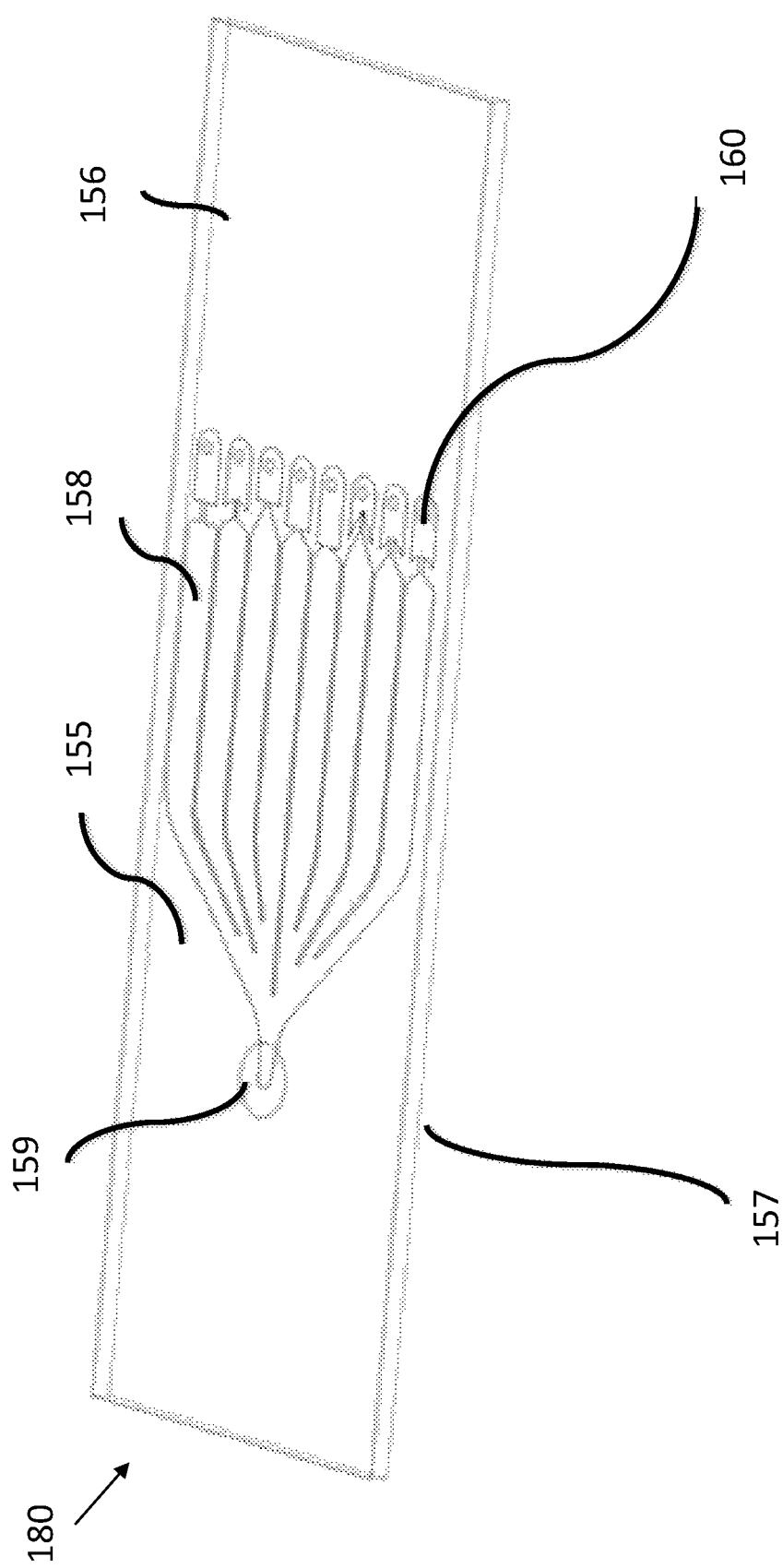
FIG. 9 is an assay device having a single inlet shared by multiple flow channels, each channel having an unshared vent in one embodiment of the disclosure.

An assay device 180 having a single inlet 159 shared by multiple flow channels 158, each channel having an unshared vent 160 is illustrated in FIG. 9.

Figure 10:
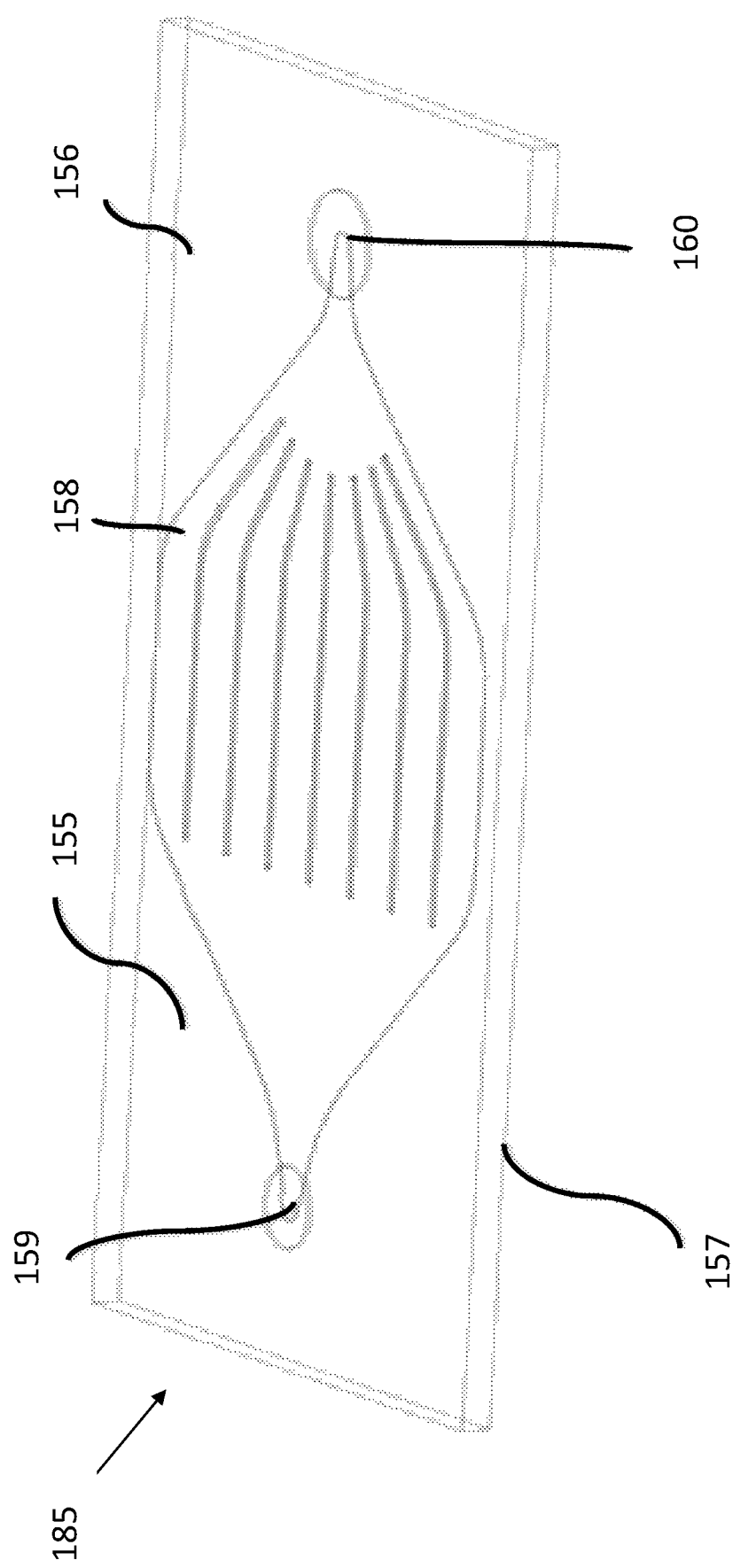
FIG. 10 is an assay device having a single inlet shared by multiple flow channels, each channel sharing a single vent.

An assay device 185 having a single inlet 159 shared by multiple flow channels 158, each channel having a single shared vent 160 is illustrated in FIG. 10.

Figure 6:
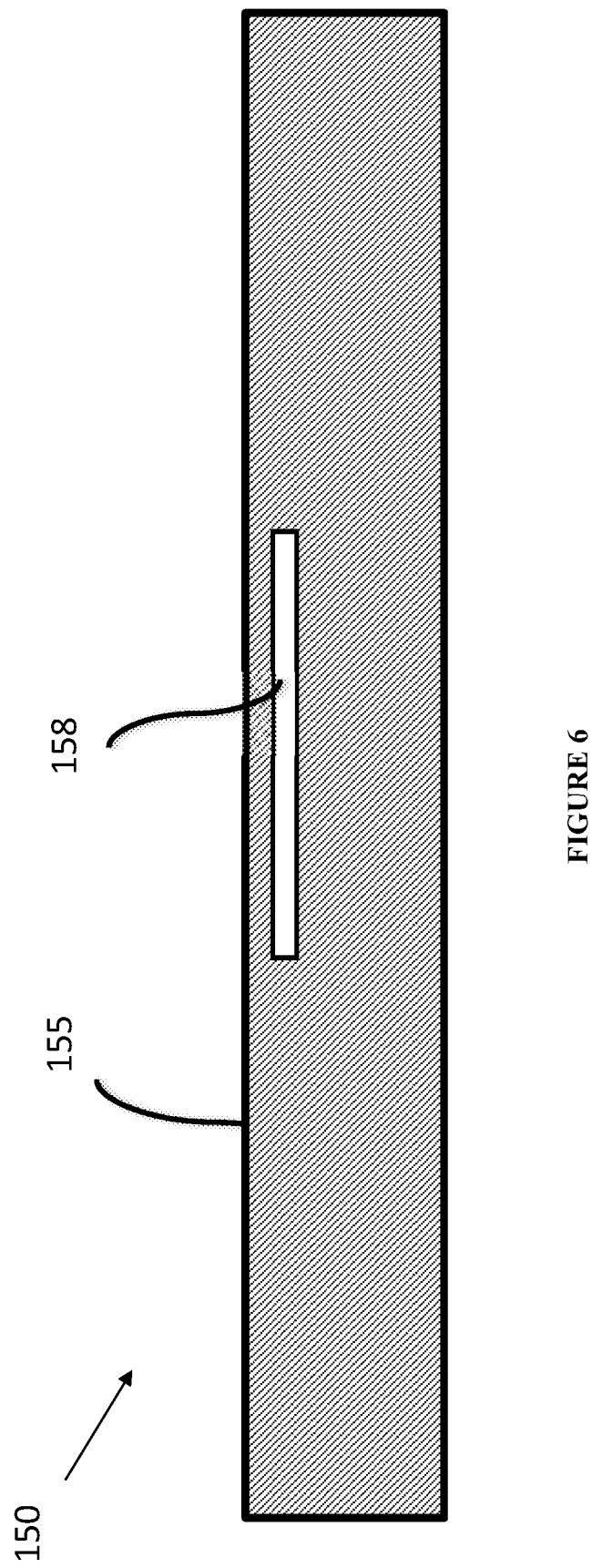
FIG. 6 is a cross-sectional view of the assay device depicted in FIG. 2 across the width of the device through the flow channel showing the device wherein the planar substrate is formed from a single unitary material layer with the flow channel being formed within the planar substrate.

In one embodiment, the planar substrate may be composed of a single unitary forming a single material layer. In such embodiments, a flow channel is formed within the single layer of material. FIG. 6 is a cross-sectional view of the assay device 150 depicted in FIG. 2 across the width of the device through the flow channel 158. As illustrated, the planar substrate 155 is formed from a single unitary material layer with the flow channel 158 being formed within the planar substrate 155.

Figure 7:
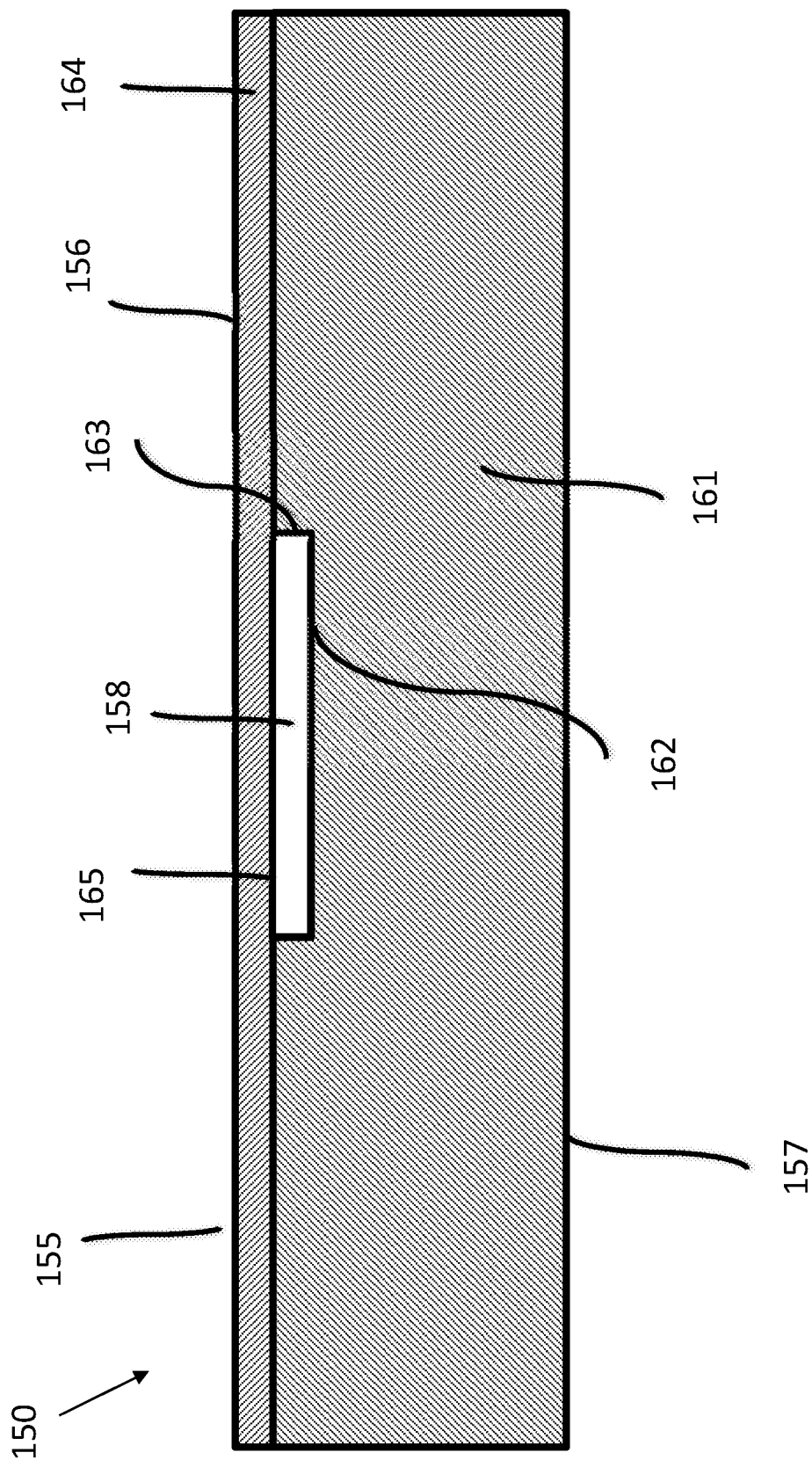
FIG. 7 is a cross-sectional view of the assay device depicted in FIG. 2 across the width of the device through the flow channel showing the device wherein the planar substrate is formed from two material layers with the flow channel being formed by coupling the two material layers.

In an alternative embodiment, the planar substrate 155 is formed from two material layers. FIG. 7 is a cross-sectional view of the assay device 150 depicted in FIG. 2 across the width of the device through the flow channel 158 in which the planar substrate 155 has two material layers. The bottom surface 157 of the planar substrate 155 is formed by a first material layer 161 which defines a bottom surface 162 of the flow channel 158 and a sidewall surface 163 of the flow channel 158, and the top surface 156 of the planar substrate 155 is formed by a second material layer 164 defining an upper surface 165 of the flow channel 158. As illustrated in FIG. 7, the flow channel 158 is formed by coupling the first material layer 161 to the second material layer 164. In embodiments, the flow channel 158 is formed before the first material layer 161 is coupled to the second material layer 164.

Figure 8:
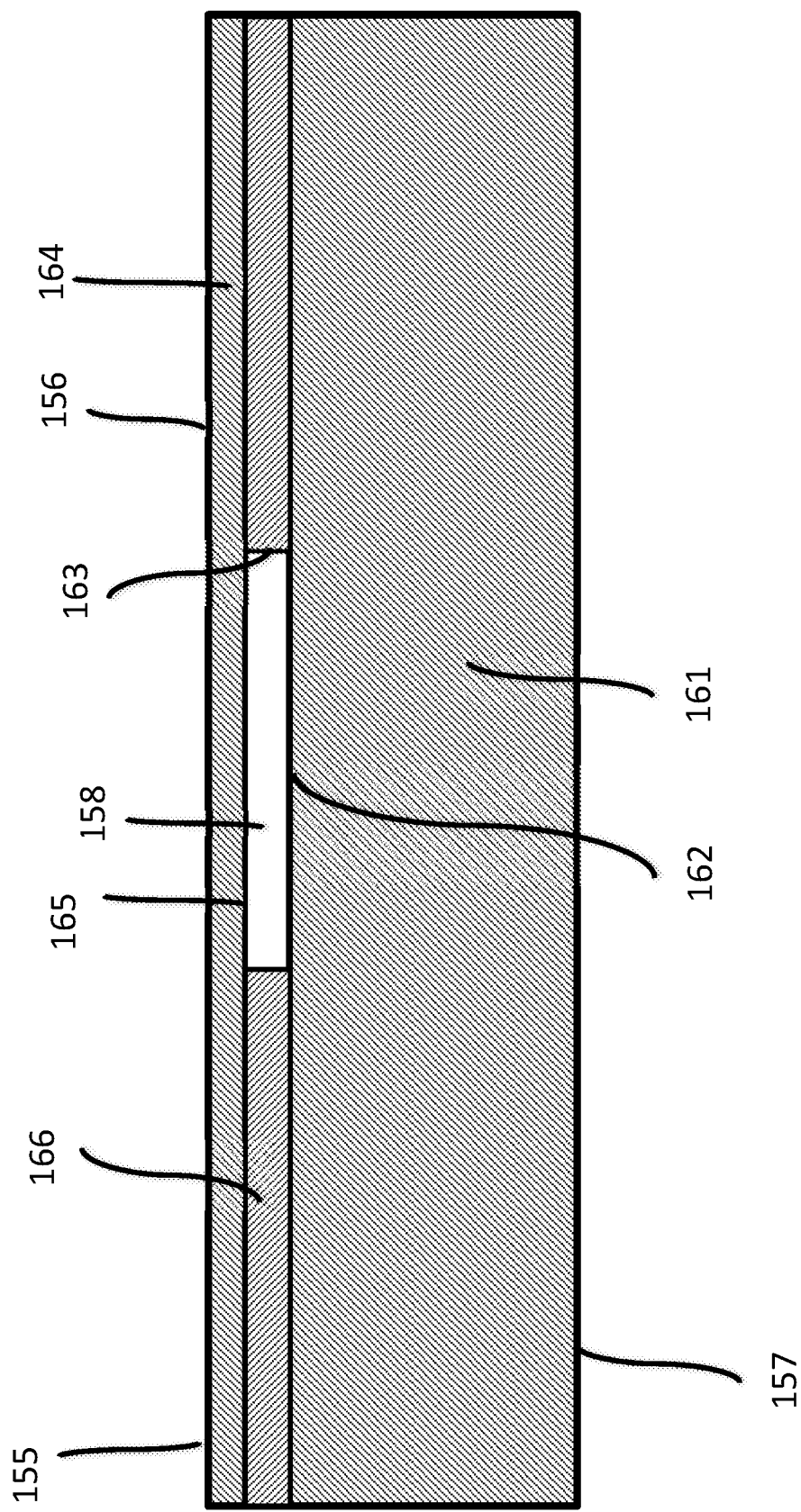
FIG. 8 is a cross-sectional view of the assay device depicted in FIG. 2 across the width of the device through the flow channel showing the device wherein the planar substrate is formed from three material layers with the flow channel being formed by coupling the three material layers.

In another alternative embodiment, the planar substrate 155 is formed from three material layers. FIG. 8 is a cross-sectional view of the assay device 150 depicted in FIG. 2 across the width of the device through the flow channel 158 in which the planar substrate 155 has three material layers. The bottom surface 157 of the planar substrate 158 is formed by a first material layer 161 which defines a bottom surface 162 of the flow channel 158, the top surface 156 of the planar substrate 155 is formed by a second material layer 164 defining an upper surface 165 of the flow channel 158, and a third material layer 166 interposed between the first material layer 161 and the second material layer 164 defines a sidewall surface 163 of the flow channel 158. As illustrated in FIG. 8, the flow channel 158 is formed by interposing the third material layer 166 between the first material layer 161 and the second material layer 164 and coupling the layers together. In embodiments, the flow channel 158 is formed by disposing the third material layer 166 at discrete locations between the first material layer 161 and the second material layer 164. This may be accomplished, for example, by depositing the third material layer 166 onto either the first material layer 161 or the second material layer 164 at discrete locations and subsequently coupling all of the layers together thereby forming the flow channel 158.

This type of laminated structure is depicted in FIGS. 3 and 4A-4B. Also included in the assay device 170 are flow channels 158 which include a tapered portion connecting each flow channel 158 to the inlet 159. For example, the flow channel 158 includes a first sidewall portion 171 and second sidewall portion 172, wherein the first sidewall portion 171 extends from the inlet 159 to the second sidewall portion 172. In embodiments the first sidewall portion 171 and the second sidewall portion 172 are joined at an angle of between about 30 and 60 degrees, including 30, 31, 32, 33, 34, 35, 35, 36, 37, 38, 39, 40, 41, 42, 43, 44, 45, 46, 46, 48, 49, 50, 51, 52, 53, 54, 55, 56, 57, 58, 59 and 60 degrees.

In various embodiments, the length of the flow channel between the inlet and the vent is sufficient to fill with liquid sample and allow formation of a monolayer of analytes. In embodiments, the length of the flow channel between the inlet and the vent is sufficient to fill with a whole blood sample, which is optionally diluted, and allow formation of a monolayer of blood cells including red blood cells, white blood cells and platelets. For example, the length of the flow channel is about between about 5.0 and 100.0 millimeters and the width of the flow channel is between about 1.0 and 50.0 millimeters. In certain embodiments, the length of the flow channel is about 10.0, 20.0, 30.0, 40.0, 50.0, 60.0, 70.0, 80.0, 90.0 or 100.0 millimeters and the width of the flow channel is about 1.0, 5.0, 10.0, 20.0, 30.0, 40.0 or 50.0 millimeters. In one embodiment the length of the flow channel is about 40.0 millimeters and the width of the flow channel is about 5.0, 10.0 or 15.0 millimeters, and the height of the flow channel is about 0.9, 1.0 or 1.1 millimeters.

In various embodiments, the top surface of the planar substrate includes an optically transparent or semi-transparent material, such as a polymeric film. The thickness of the material covering the flow channel is about 0.05, 0.1, 0.125, 0.15, 0.175, 0.2, 0.25 to 0.3 millimeters. In one embodiment the thickness is about 0.175 millimeters.

In embodiments, the assay device includes three material layers. The second material layer 164 includes an optically transparent or semi-transparent material, such as a polymeric film. The thickness of the material covering the flow channel is between about 0.05, 0.1, 0.125, 0.15, 0.175, 0.2, 0.25 to 0.3 millimeters. In one embodiment the thickness is about 0.175 millimeters. The first material layer 161 includes an optically transparent or semi-transparent material. The thickness of the first material layer is between about 0.1, 0.5, 1.0, 1.5 to 2.0 millimeters. In one embodiment the thickness is about 1.0 millimeters. The third material layer 166 includes an optically transparent, semi-transparent or opaque material. The thickness of the third material layer defining the height of the flow channel is between about 0.02 millimeters and 0.25 millimeters, inclusive. In some embodiments, the thickness is between about 0.075 and 0.125 millimeters, inclusive. In embodiments, the depth is between about 0.08 or 0.09 millimeters to about 1.0, 1.1 or 1.2 millimeters. In one embodiment the thickness is about 1.0 millimeters.

In various embodiments, layers of the planar substrate may be coupled to one another using a number of techniques known in the art. For example, layers may be bonded to one another via laser bonding, laminating, ultrasonic bonding, thermal bonding, solvent bonding, or adhesive bonding. In one embodiment, the first material layer 161 and the second material layer 164 are adhesively bonded to one another via the interposing third material layer 166 which is a pressure sensitive adhesive.

As will be appreciated, each of the layers of the assay device may be composed of a different material type or the same material type with respect to each other. For example, in one embodiment, each of the first and second material layers are composed of the same material type. In an alternative embodiment, each of the first and second material layers are composed of different material types. In another embodiment, each of the first, second and third material layers are composed of the same material type. In an alternative embodiment, each of the first, second and third material layers are composed of different material types. In still another embodiment, the first and third material layers, may be composed of the same material type and the second layer may be composed of a different material type.

The choice of materials for each layer may be chosen to impart a desired characteristic to the assay device, including for example, transparency, fluorescence, rigidity and the like. In some embodiments, the layers have the same or different parameters for each of the following parameters: material, thickness, shape, area, flexibility, rigidity, surface property, and/or optical transparency.

There are several material types that may be utilized to form the planar substrate including any layer thereof. In various embodiments, the planar substrate is composed of a single material, composite materials, multiple materials, multilayer of materials, alloys, or a combination thereof. The material for use in forming the planar substrate including any layer thereof includes an inorganic material, an organic material, or a mix. Inorganic materials for the planar substrate including any layer thereof include, but are not limited to, glass, quartz, oxides, silicon-dioxide, silicon-nitride, hafnium oxide (HfO), aluminum oxide (AlO), semiconductors: (silicon, GaAs, GaN, and the like), metals (e.g., gold, silver, copper, aluminum, Ti, Ni, and the like), ceramics, or any combinations of thereof. Organic materials for the planar substrate including any layer thereof include, but are not limited to, polymers (e.g. plastics) or amorphous organic materials. Polymers for the planar substrate including any layer thereof include, but are not limited to, acrylate polymers, vinyl polymers, olefin polymers, cellulosic polymers, noncellulosic polymers, polyester polymers, Nylon, cyclic olefin copolymer (COC), poly(methyl methacrylate) (PMMA), polycarbonate (PC), cyclic olefin polymer (COP), liquid crystalline polymer (LCP), polyamide (PA), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFA), polydimethylsiloxane (PDMS), rubbers, or any combinations of thereof. In some embodiments, the planar substrate includes a pressure sensitive adhesive.

As will be appreciated, there are several parameters that impact flow of a liquid sample through a flow channel. By way of example, some parameters include: dimensions and configuration of the flow channels, surface energy of the surfaces of the flow channels, degree of hydrophobicity or hydrophilicity of the surfaces of the flow channels, inclusion of functionalized coatings on the surfaces of the flow channels, and inclusion of texturization or microscopic patterning on the surfaces of the flow channels. It is envisioned that the assay device of the present disclosure may by modified to control any combination of these parameters.

As such, in embodiments, surfaces of the planar substrate, such as an internal surface of the flow channel, may be treated to alter surface energy and consequently the degree of adhesion of an analyte with the surface. In one particular embodiment, a surface is coated to increase hydrophilicity of the substrate surface to ensure a desired flow rate and monolayer generation.

In embodiments, a surface of the planar substrate, such as a surface of the flow channel, may be functionalized. A surface may be referred to as "functionalized" when it includes a linker, a scaffold, a building block, or other reactive moiety attached thereto, whereas a surface may be "nonfunctionalized" when it lacks such a reactive moiety attached thereto.

A functionalized surface may refer to a surface having a functional group. A functional group may be a group capable of forming an attachment with another functional group. For example, a functional group may be biotin, which may form an attachment with streptavidin, another functional group. Exemplary functional groups may include, but are not limited to, aldehydes, ketones, carboxy groups, amino groups, biotin, streptavidin, nucleic acids, small molecules (e.g., for click chemistry), homo- and hetero-bifunctional reagents (e.g., N-succinimidyl(4-iodoacetyl) aminobenzoate (STAB), dimaleimide, dithio-bis-nitrobenzoic acid (DTNB), N-succinimidyl-S-acetyl-thioacetate (SATA), N-succinimidyl-3-(2-pyridyldithio) propionate (SPDP), succinimidyl 4-(N-mafeimidomethyl)-cyclohexane-1-carboxylate (SMCC) and 6-hydrazinonicotimide (HYNIC), and antibodies. In some instances, the functional group is a carboxy group (e.g., COOH).

In various embodiments, a surface may be treated or coated to render the surface hydrophilic or hydrophobic. A variety of surface treatments and surface modification techniques may be used to alter the properties of the surface. Examples include, but are not limited to, oxygen plasma treatments to render hydrophobic material surfaces more hydrophilic, the use of wet or dry etching techniques to smooth (or roughen) silicon surfaces, adsorption and/or grafting of polyethylene oxide or other polymer layers to substrate surfaces to render them more hydrophilic and less prone to non-specific adsorption of biomolecules and cells, the use of silane reactions to graft chemically-reactive functional groups to otherwise inert silicon surfaces. Photodeprotection techniques can be used to selectively activate chemically-reactive functional groups at specific locations of the surface, for example, the selective addition or activation of chemically-reactive functional groups such as primary amines or carboxyl groups on the surface may be used to covalently couple oligonucleotide probes, peptides, proteins, or other biomolecules to the surface. In general, the choice of surface treatment or surface modification utilized will depend both on the type of surface property that is desired and on the type of material from which the substrate is made.

With regard to hydrophilicity of a surface, the surface may be treated or coated to reduce the contact angle of a liquid sample on the surface to about 90 degrees or less. In embodiments, the hydrophilicity of a surface is increased such that the contact angle of the surface is less than about 85, 80, 75, 70, 65, 60, 55, 50, 45, 40, 35, 30, 25, 20, 15 or 10 degrees. In some embodiments, the hydrophilicity of the bottom surface of the flow channel is increased such that the contact angle of the surface is less than about 85, 80, 75, 70, 65, 60, 55, 50, 45, 40, 35, 30, 25, 20, 15 or 10 degrees. This improves flow of liquid sample through the feature, and reduces the risk of air bubble formation and entrapment.

The functional groups on a surface may be different for different regions of the surface. The functional groups on the surface may be the same for all regions of the surface. For example, the entire internal surface of the flow channel may include the same functional group. Alternatively, different regions of the internal surface of the flow channel may include different functional groups.

Addition of functional groups to a surface may be utilized to form capture regions on the surface to immobilize or bind an analyte. In this manner, a specific analyte may be concentrated at a specific region of the surface to increase detection and/or analysis of the analyte. This can also be accomplished by texturizing the surface or including microscopic structures which may also be used utilized to inhibit or reverse agglomeration of analytes.

In some embodiments, the depth of a flow channel is substantially uniform throughout the entire channel. In alternative embodiments the depth of a flow channel varies across an individual channel. In embodiments in which the assay device includes multiple flow channels, all of the flow channels may have the same depth, or each flow channel may have a different depth with respect to one another.

In various embodiments, a number of techniques may be used to form the inlet, the flow channel, or the vent. Such techniques may include, for example, molding, hot embossing, laser engraving, three-dimensional printing, laminating and/or etching.

In embodiments, the depth of a flow channel can be between about 0.02 millimeters and 0.25 millimeters, inclusive. In some embodiments, the depth can be between about 0.1 and 0.15 millimeters, inclusive. In embodiments, the depth is about 0.02, 0.03, 0.04, 0.05, 0.06, 0.08, 0.09, 0.1, 0.11, 0.12, 0.13, 0.14, 0.15, 0.16, 0.17, 0.18, 0.19, 0.20, 0.21, 0.22, 0.23, 0.24 or 0.25 millimeters. In embodiments, the depth is between about 0.08 and 0.12 millimeters, including about 0.08, 0.09, 0.1, 0.11 or 0.12 millimeters. As discussed herein, smaller or larger depth is also possible by adjusting a dilution factor of the liquid sample.

In embodiments, the height of the monolayer that is generated in a flow channel can be between about 0.02 millimeters and 0.25 millimeters, inclusive. In some embodiments, the height can be between about 0.1 and 0.15 millimeters, inclusive. In embodiments, the height is about 0.02, 0.03, 0.04, 0.05, 0.06, 0.08, 0.09, 0.1, 0.11, 0.12, 0.13, 0.14, 0.15, 0.16, 0.17, 0.18, 0.19, 0.20, 0.21, 0.22, 0.23, 0.24 or 0.25 millimeters. In embodiments, the height is between about 0.08 and 0.12 millimeters, including about 0.08, 0.09, 0.1, 0.11 or 0.12 millimeters. As discussed herein, smaller or larger height is also possible by adjusting a dilution factor of the liquid sample.

Figure 11:
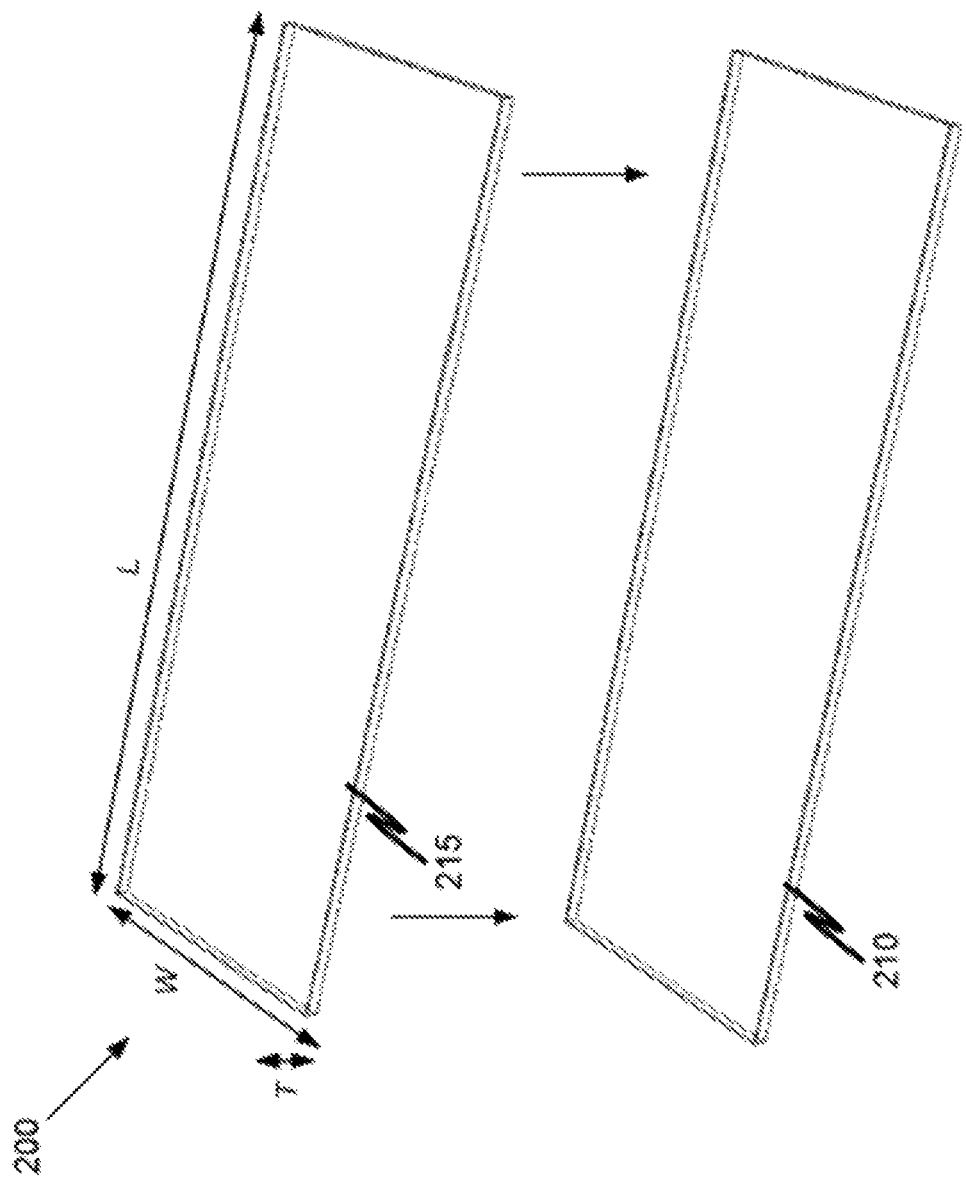
FIG. 11 is an assay device including a planar slide and a cover in one embodiment of the disclosure.

FIG. 11 is an assay device 200 comprising a planar slide 210 and a cover 215. The assay device is substantially flat. The cover 215 is bonded to and overlays at least a portion of the planar slide 210, as indicated by the arrows. Each of the planar slide 210 and the cover 215 can be transparent or semitransparent and/or fluorescent to facilitate imaging. The assay device 200 can be imaged from the top. An imaging area, e.g., imaging area 100, can coincide with a portion of the assay device.

As discussed herein, the cover 215 can be bonded to the planar slide 210 using a number of methods, e.g., laser bonding, laminating, ultrasonic bonding, thermal bonding, solvent bonding, or adhesive bonding. The cover 215 can include a plastic film of thickness T, wherein T can be between 100 microns and 500 microns, inclusive. In one variation, the cover may have a thickness of 150 microns to 200 microns, inclusive. The cover 215 can have the same length L and/or width W as the planar slide 210, or the cover 215 can have a smaller length L and/or width W than the planar slide 210. Prior to bonding the cover 215 to the planar slide 210, a shape can be formed in the planar slide 210 to receive a whole blood sample and control a flow and a depth of the whole blood sample on a top side of the planar slide and beneath the cover 215. The shape may include a number of contact points between the cover 215 and the top of the planar slide 210.

Each of the planar slide 210 and the cover 215 can be hydrophilic to facilitate the flow of the liquid sample such that a monolayer is generated. The planar slide 210 and the cover 215 can be surface treated to decrease contact angle, improve flow of sample through the feature, and reduce the risk of air bubble formation and entrapment.

Figure 12A:
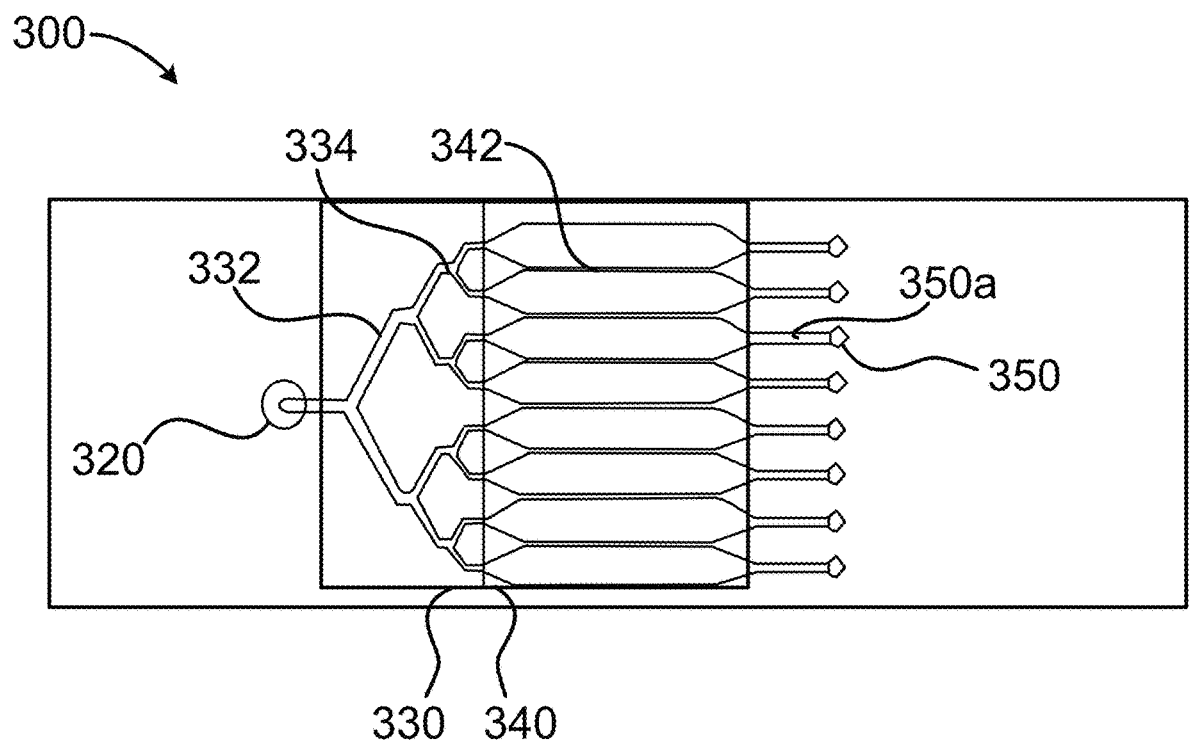
FIGS. 12A and 12B are a top-down view and a perspective view, respectively, of an assay device having a "binary tree" design in one embodiment of the disclosure.
Figure 12B:
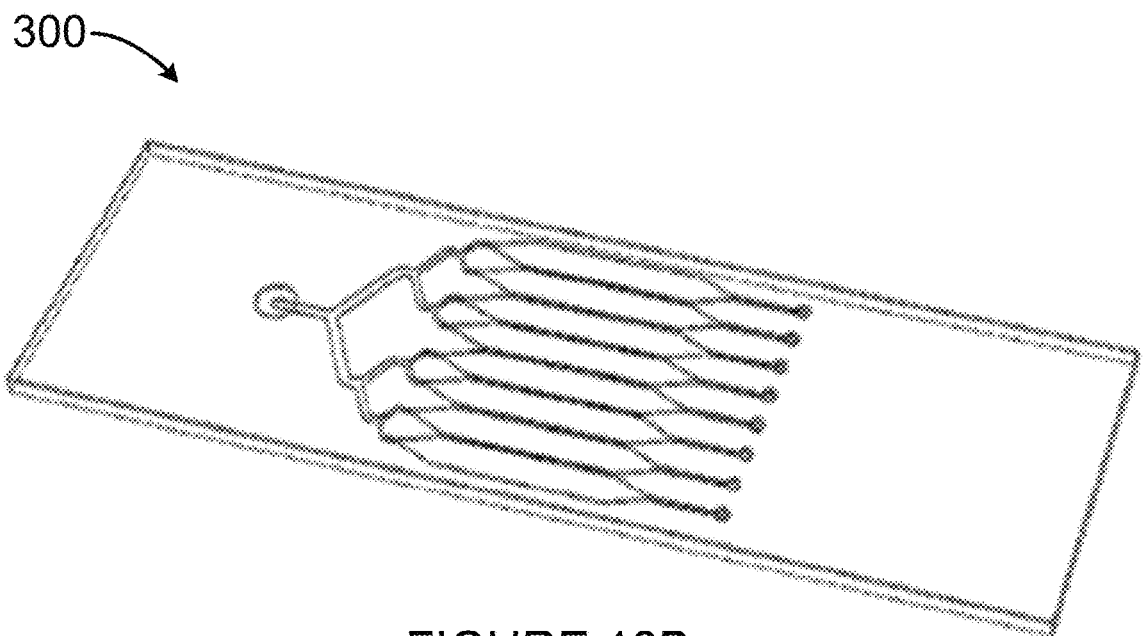

FIGS. 12A and 12B are a top-down view and a perspective view, respectively, of an assay device 300 having a "binary tree" design. The assay device 300 includes a planar slide 310 and a cover, e.g., the cover 215. The planar slide 310 includes an inlet 320, a binary tree 330 comprising edges 332 and nodes 334, one or more channels 340 that extend along a top surface of the planar slide 310 and one or more vents 350 with capillary stop structures 350a. The inlet 320 is coupled to the binary tree 330, the binary tree 330 is coupled to the one or more channels 340, and the one or more channels 340 are coupled to one or more vents 350. The one or more channels 340 taper at the couplings to the binary tree 330 and the one or more vents 350. The inlet 320 can be configured to accept a liquid sample from a pipette tip. In the assay device 300, each channel 340 is coupled to a corresponding vent 350. In another variation, the one or more channels 340 can be coupled to a same vent.

In the assay device 300, a liquid sample can be received by the inlet 320 and flow in a rightward direction from the inlet 320, through the binary tree 330, to the one or more channels 340. The binary tree 330 can help to control a depth and a flow of the liquid sample in the one or more channels 340 such that a monolayer is formed. Each of the one or more channels 340 is bordered by ridges 342 that support a cover that overlays the one or more channels 340, e.g., cover 215. The cover, the one or more channels 340, and the ridges 342 can help to control the depth and the flow of the liquid sample.

The one or more vents 350 can include capillary stop structures that are not covered by the cover. The capillary stop structures may help to prevent or reduce entrapment of air bubbles in the liquid sample. The capillary stop structures may stop a flow of the liquid sample and prevent the liquid sample from spilling out of the assay device 300.

FIGS. 13A and 13B are a top-down view and a perspective view, respectively, of an assay device 400 having pluralities of posts. The assay device 400 includes a planar slide 410 and a cover, e.g., the cover 215. The planar slide 410 includes inlet 420, a first plurality of posts 430, a single channel 440 that extends along a top surface of the planar slide 410 and includes a second plurality of posts 445, and an vent 450.

Each post includes a tubular structure within and extending from a floor of the single channel 440 to the cover. A first density of the first plurality of posts 430 can be different, e.g., greater than a second density of the second plurality of posts 445. The first and second pluralities of posts 430 and 445 help to support the cover that overlays the planar slide 410. The single channel 440 is coupled to the inlet 420 by an area comprising the first plurality of posts 430 and to the vent 450.

In this exemplary assay device 400, a liquid sample can be received by the inlet 420 and flow in a rightward direction from the inlet 420, through the first plurality of posts 430 into the single channel 440 and through the second plurality of posts 445. The first and second pluralities of posts 430 and 445 and the cover can help to control the depth and the flow of the whole blood sample such that a monolayer is formed.

The vent 450 can include a vent that is not covered by the cover. The vent can help to prevent or reduce entrapment of air bubbles in the liquid sample and can facilitate the flow of the liquid sample, such that the desired depth of the liquid sample is achieved more quickly.

FIGS. 14A and 14B are a top-down view and a perspective view, respectively, of an assay device 500 having posts, ridges, and channels. The assay device 500 includes a planar slide 510 and a cover, e.g., the cover 215. The planar slide 510 includes inlet 520, a plurality of posts 530, one or more channels 540 that extend along a top surface of the planar slide 510, an vent 550.

Each of the one or more channels 540 is bordered by ridges 545 that support a cover that overlays the one or more channels 540, e.g., cover 215. The plurality of posts 530 and the ridges 545 help to support the cover that overlays the planar slide 510. Each post includes a tubular structure within and extending from a floor of the single channel 440 to the cover. Each ridge 545 includes a vertical wall that separates the one or more channels 540 and extends from a floor of the one or more channels 540 to the cover. The one or more channels 540 are coupled to the inlet 520 by an area comprising the plurality of posts 530 and to the vent 550. The one or more channels 540 taper at the coupling to the vent 550.

In the exemplary assay device 500, a liquid sample can be received by the inlet 520 and flow in a rightward direction from the inlet 520, through the plurality of posts 530 into the one or more channels 540. The plurality of posts 530, the ridges 545, and the cover can help to can help to control the depth and the flow of the whole blood sample such that a monolayer is formed. The vent 550 can include one or more vents that are not covered by the cover. The vent can help to prevent or reduce entrapment of air bubbles in the whole blood sample and can facilitate the flow of the liquid sample, such that the desired depth of the whole blood sample is achieved more quickly.

Figure 15A:
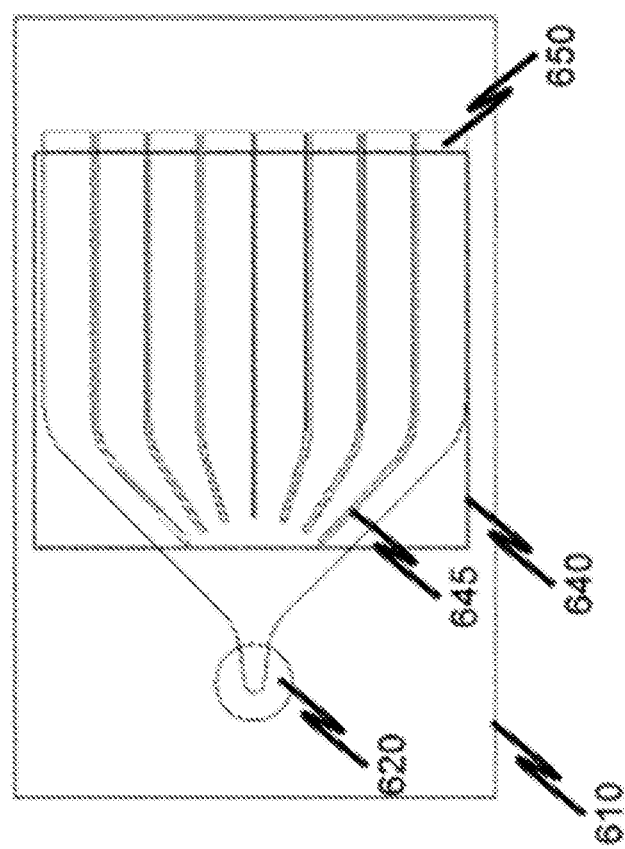
FIGS. 15A and 15B are a top-down view and a perspective view, respectively, of an assay device having ridges and vents in one embodiment of the disclosure.
Figure 15B:
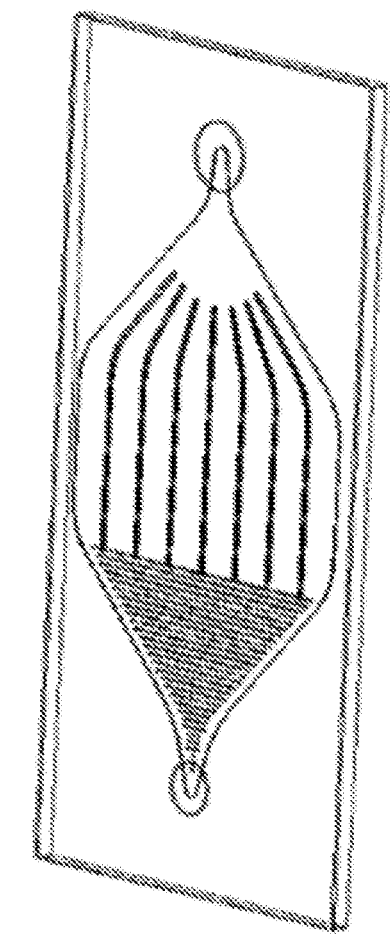

FIGS. 15A and 15B are a top-down view and a perspective view, respectively, of an assay device 600 having ridges and vents. The assay device 600 includes a planar slide 610 and a cover, e.g., the cover 215. The planar slide 610 includes inlet 620, one or more channels 640 that extend along a top surface of the planar slide 610, and one or more vents 650. Each of the one or more channels 640 is bordered by ridges 630 that support a cover that overlays the one or more channels 640, e.g., cover 215. The ridges 630 help to support the cover that overlays the planar slide 610. The one or more channels 640 are coupled to the inlet 620 and to the one or more vents 650. The one or more channels 640 taper at the coupling to the inlet 620.

In the exemplary assay device 600, a liquid sample can be received by the inlet 620 and flow in a rightward direction from the inlet 620, into the one or more channels 640. The ridges 645, and the cover can help to can help to control the depth and the flow of the whole blood sample such that a monolayer is formed. The one or more vents 650 help to prevent or reduce entrapment of air bubbles in the liquid sample and can facilitate the flow of the liquid sample, such that the desired depth of the liquid sample is achieved more quickly.

In the exemplary assay device 600, each channel 640 is coupled to a corresponding vent 650. In another variation, the one or more channels 640 can be coupled to a same vent.

FIGS. 16A and 16B are a top-down view and a perspective view, respectively, of an assay device 700 having a plurality of ridges and a plurality of vents with capillary stop structures. The assay device 700 includes a planar slide 710 and a cover, e.g., the cover 215. The planar slide 710 includes inlet 720, one or more channels 740 that extend along a top surface of the planar slide 710, and one or more vents 750. Each of the one or more channels 740 is bordered by ridges 730 that support a cover that overlays the one or more channels 640, e.g., cover 215. The ridges 730 help to support the cover that overlays the planar slide 710. The one or more channels 740 are coupled to the inlet 720 and to the one or more vents 750. The one or more channels 740 taper at the couplings to the inlet 720 and the one or more vents 750.

In this exemplary assay device 700, a liquid sample can be received by the inlet 720 and flow in a rightward direction from the inlet 620, into the one or more channels 740. The ridges 730 and the cover can help to can help to control the depth and the flow of the liquid sample such that a monolayer is formed. The one or more vents 750 can each include a capillary stop structure that is not covered by the cover. The capillary stop structure can help to prevent or reduce entrapment of air bubbles in the liquid sample and can facilitate the flow of the liquid sample, such that the desired depth of the liquid sample can be achieved more quickly.

In this exemplary assay device 700, each channel 740 is coupled to a corresponding vent 750. In another variation, the one or more channels 740 can be coupled to a same vent.

Figure 17:
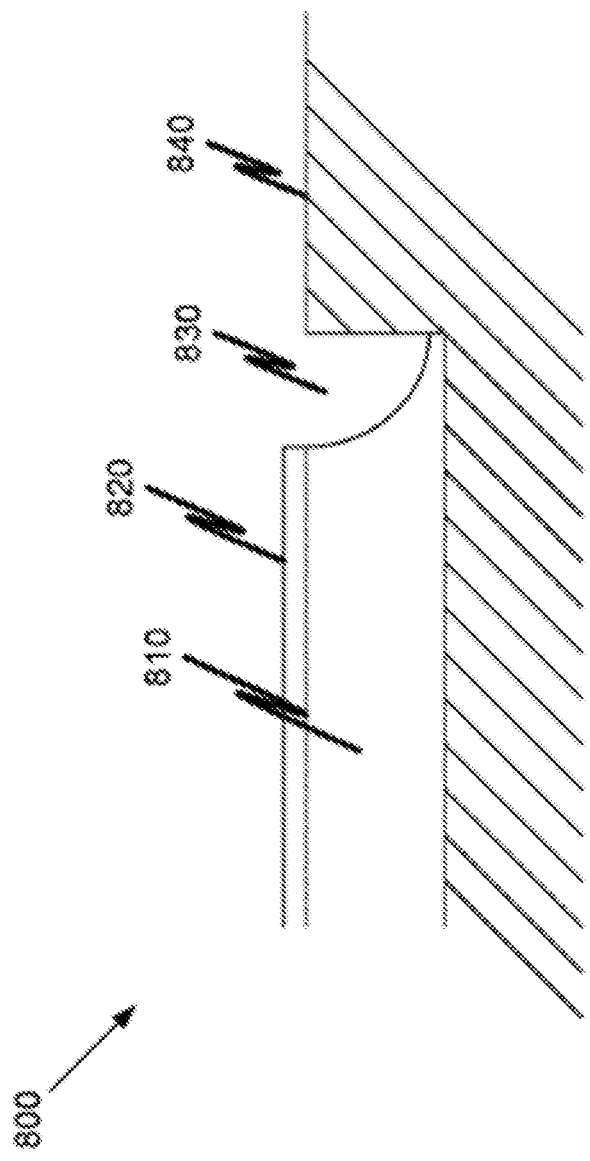
FIG. 17 depicts a vent forming part of an assay device in one embodiment of the disclosure.

FIG. 17 depicts a vent forming part of an assay device 800. The exemplary vent 800 includes a channel 810, in which a liquid sample has flowed, a cover 820 that covers at least a portion of the channel 810. The vent 830 is at the end of the channel 810. The cover 820 does not overlay the vent. The vent 830 is formed in the planar slide 840. The vent 830 enables a flow of the liquid sample through the channel 810 and facilitates a generation of a monolayer, i.e., single cell layer.

Figure 18:
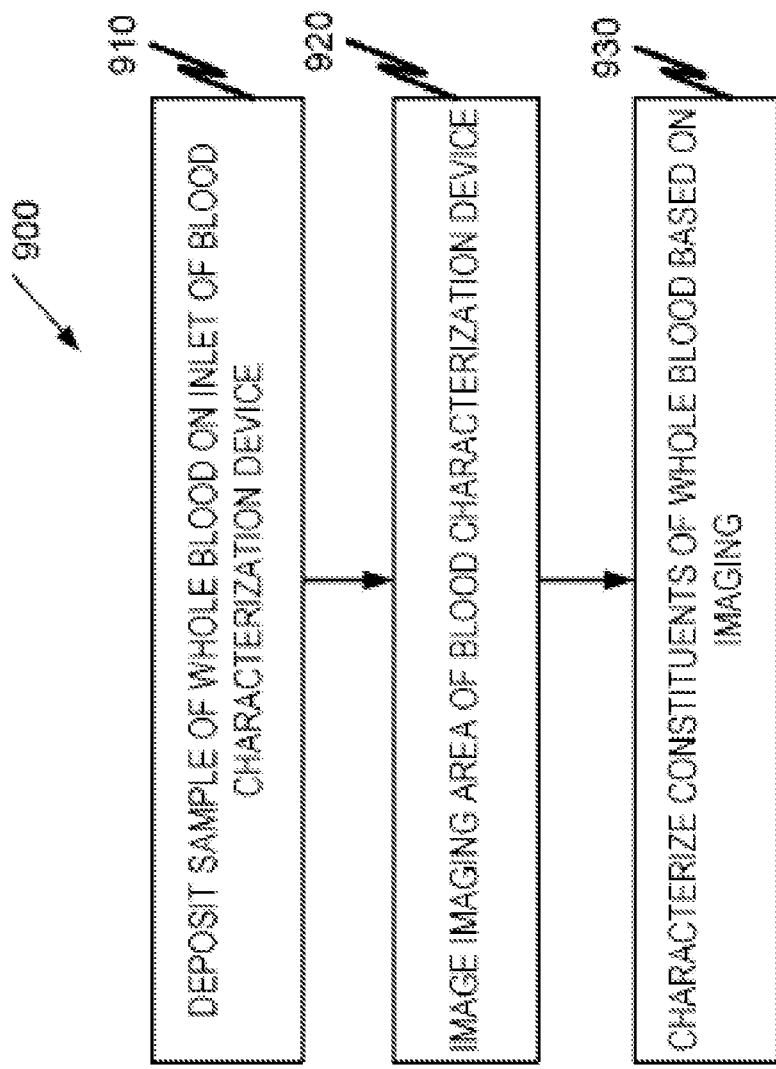
FIG. 18 depicts a process flow diagram for using an assay device in one embodiment of the disclosure.

FIG. 18 depicts a process flow diagram for using an assay device. A sample of whole blood is deposited into an inlet of the assay device at 910. At 920, an imaging area of the assay device is imaged. Constituents of the whole blood are characterized based on the imaging at 930.

Figure 19:
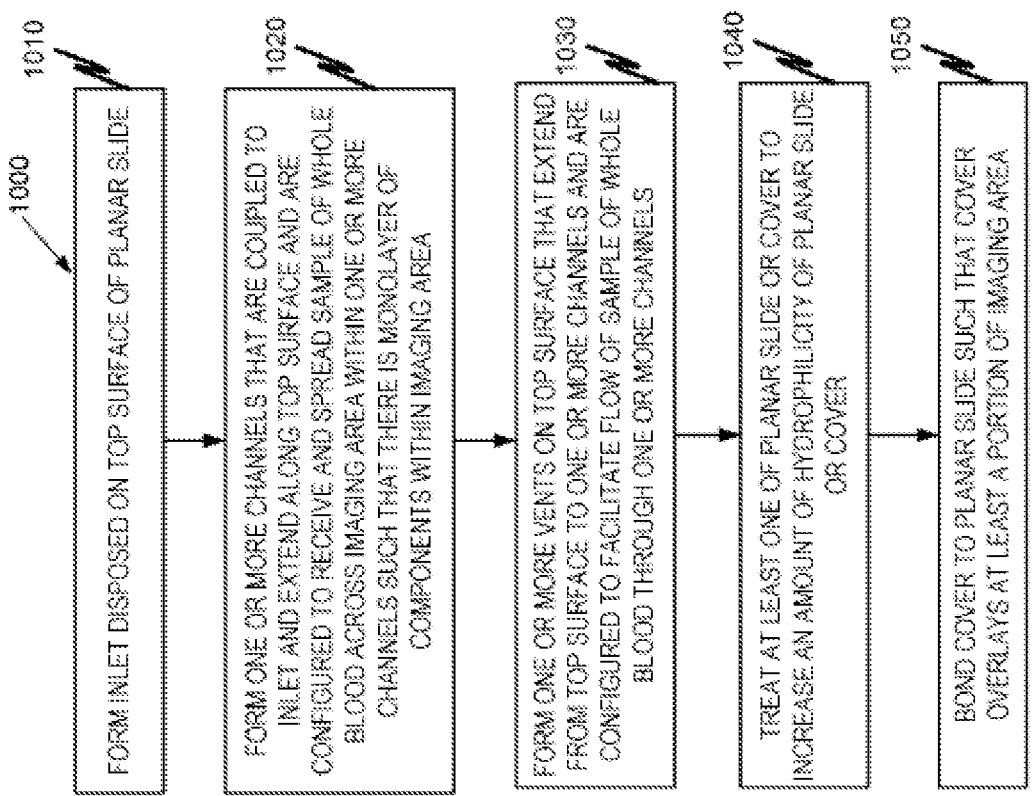
FIG. 19 depicts a process flow diagram for assembling an assay device in one embodiment of the disclosure.

FIG. 19 depicts a process flow diagram for assembling an assay device. At 1010, an inlet disposed on a top surface of a planar slide is formed. The inlet is configured to receive a sample of whole blood having components including red blood cells, white blood cells, and platelets. One or more channels is formed on the top surface at 1020. The one or more channels are coupled to the inlet and extend along the top surface. The one or more channels are configured to receive and spread the sample of whole blood across an imaging area within the one or more channels such that there is a monolayer of the components within the imaging area. One or more vents is formed on the top surface at 1030. The one or more vents extend from the top surface to the one or more channels and are configured to facilitate a flow of the sample of whole blood through the one or more channels. At 1040, at least one of the planar slide or a cover is treated to increase an amount of hydrophilicity of the planar slide or the cover. The cover is bonded to the planar slide such that the cover overlays at least a portion of the imaging area at 1050. The one or more channels and the cover in combination are configured to control a depth of the monolayer.

In another embodiment of assembling an assay device, the device is formed of a planar substrate having a top surface and a bottom surface in which the following is formed: (i) a flow channel disposed within the planar substrate and extending along a dimension of the planar substrate between the top surface and the bottom surface; (ii) an inlet fluidly coupled to the flow channel; and (iii) a vent fluidly coupled to the channel and operable to facilitate flow of a liquid sample through the channel. The method further includes treating at least one surface of the flow channel to increase an amount of hydrophilicity of the at least one surface.

Use of Assay Device

As discussed herein, the assay device of the present disclosure may be used, for example, in connection with a system for performing analyte detection as described in U.S. Patent Application Publication No. 2019/0086324 the entire contents of which is incorporated herein by reference in its entirety. As discussed further in detail below, an assay device may be included in a consumable support pack or sample plate of the detection system, loaded into the detection system and subsequently processed and analyzed by the system.

Alternatively, the assay device of the present disclosure may be used with any number of other conventional imaging systems including microscopic or cytometric detection and visualization of cells on a solid substrate, fluorescent imaging, and the like.

Detection System

The present disclosure provides an automated system for performing an assay. The system includes an assay device as described herein and a detection module, such as an imager. While this disclosure illustrates use of imaging to detect an analyte in a liquid sample, other types of detection modalities may be utilized in addition to imaging or in the alternative.

For example, in some embodiments analyte detection is made by a detection module having functionality for measuring a signal related to the analyte, wherein the signal is an optical signal, electrical signal, mechanical signal, chemi-physical signal, or any combination of thereof.

In some embodiments analyte detection is made by a detection module having functionality for measuring an optical signal related to the analyte, wherein the optical signal comprising light reflection, scattering, transmission, absorption, spectrum, color, emission, intensity, wavelength, location, polarization, luminescence, fluorescence, electroluminescence, chemoluminescence, electrochemoluminescence, or any combination of thereof.

In some embodiments analyte detection is made by a detection module having functionality for measuring an electric signal related to the analyte, wherein the electrical signal comprising charge, current, impedance, capacitance, resistance, or any combination of thereof.

In some embodiments analyte detection is made by measuring a mechanical signal related to the analyte, wherein the mechanical signal comprising mechanical wave, sound wave, shock wave, or vibration.

In some embodiments analyte detection is made by a detection module having functionality for measuring a chemi-physical signal related to the analyte, wherein the chemi-physical signal includes, but not limited to, pH value, ions, heat, gas bubbles, color change, that are generated in a reaction.

In some embodiments the assay device is used with a multianalyte detection system as described in as described in U.S. Patent Application Publication No. 2019/0086324 which allows for low-cost testing of a small sample volume (e.g., a 10-100 µl blood sample) for multiple analytes. The multianalyte detection system, generally involves analyzing two or more different analytes (e.g., a small molecule analyte, a protein analyte, and a cell) using different assay formats (e.g., a heterogeneous assay and a solution assay) or different readouts (e.g., fluorescence and absorbance).

It is noted that while the present disclosure may refer to a multianalyte detection system which includes an imager in addition to one or more additional types of detection modules, the detection system may be configured to process an assay device of the disclosure without performing additional assays and analysis.

The present disclosure is based, in part, on the realization that the field of direct-to-consumer diagnostics (DTC diagnostics) can benefit from an assay platform that allows for reliable, low-cost testing of a very small volume of a consumer's biological sample (e.g., a blood sample). A desirable assay platform can, e.g., conduct a parallel and robust analysis of multiple analytes, e.g., analytes in a multianalyte set. A multianalyte set can, for example, be related to the consumer's health or general wellness. A multianalyte set can include, e.g., one or more analytes of different analyte classes, such as a cell (e.g., eukaryotic cell; mammalian cell; red blood cell or leukocyte) in combination with a small molecule analyte (e.g., <500 Da; cholesterol, glucose), an/or a large molecule analytes (e.g., >10 kDa; cytokines, hemoglobin, DNA).

Figure 20:
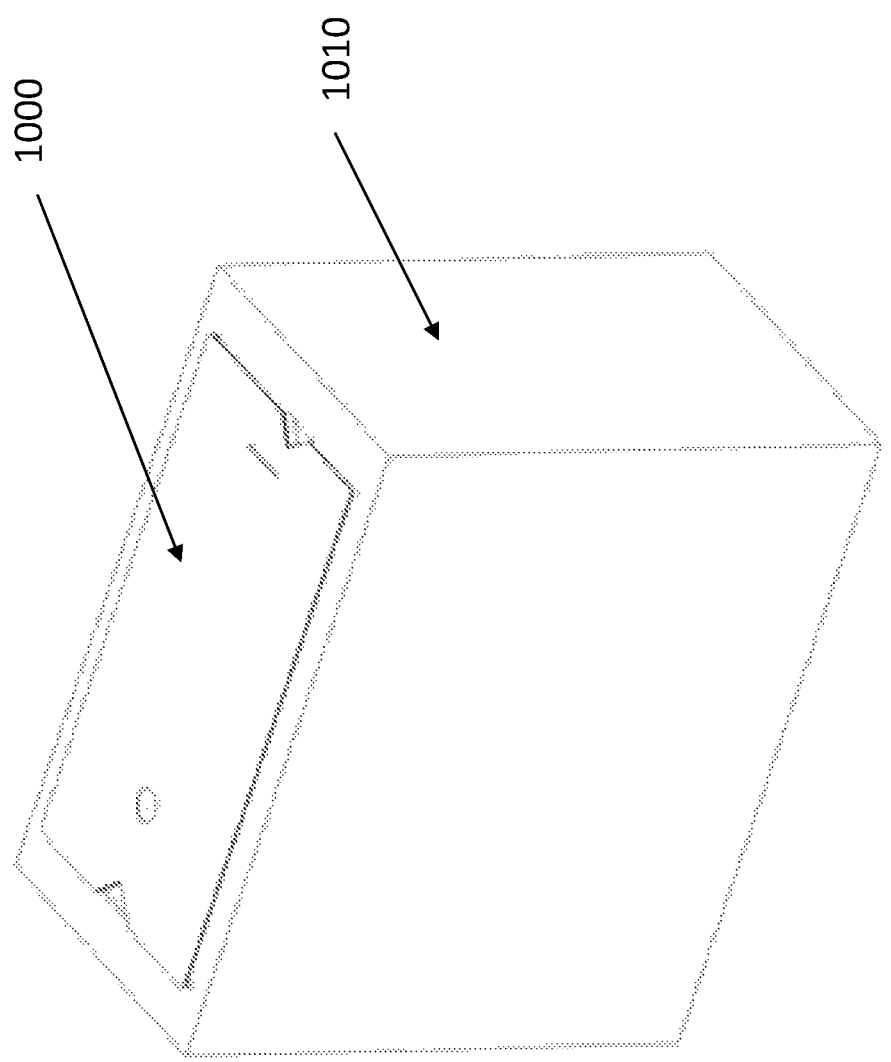
FIG. 20 is an illustration of an assay device in a consumable support tray for use in a detection system in one embodiment of the disclosure.

In embodiments, the assay device described herein is incorporated into a consumable support pack of the detection system which is processed and analyzed by an imager of the detection system. FIG. 20 depicts assay device 1000 set into a consumable support 1010 for use in the detection system.

The detection system also includes a detection module for detection of an assay that is performed in a multiwell sample plate that optionally includes two or more different pluralities of wells whereby each of the different pluralities of wells is configured to perform one or more different types of assays for one or more different analytes. For example two different pluralities of wells on the same multiwell plate can differ from one another with respect to one or more properties, for example, well geometry (e.g., cube or cylinder) or dimension (e.g., volume), color or transparency of a well's wall or floor (e.g., translucent or opaque), well surface property (e.g., high protein-binding or cell adhesion promoting), or with respect to any other property affecting the performance of an assay for an analyte (e.g., assay reagents).

Accordingly, the systems, devices and methods described herein allow for the highly coordinated performance of different assays, including cell imaging and analysis, kinetic assays and endpoint assays. Different assay formats can be conducted in parallel via an assay device of the disclosure and different pluralities of wells of the sample plate and different types of readouts can be obtained at one or more timepoints from different wells. The multianalyte detection systems described herein are configured to handle and process an assay device as well as a multiwell sample plate and to read out different assays running in parallel. In some embodiments, the sample of a single patient is analyzed in parallel for a plurality of analytes in an assay device in combination with different pluralities of test wells in sample plate. This enables "spatial multiplexing," i.e., the parallel performance of different analytical assays on the same blood sample.

Multiwell Plates

The detection system utilizes a multiwell plate comprising two or more different pluralities of wells. In some embodiments, the multiwell plate can facilitate the parallel performance of two or more different assay formats (e.g., a fluorescence and absorbance based format) or to facilitate the performance of different assays for two or more different analytes in a sample (e.g., a high-abundance and a low-abundance analyte). Each of the different pluralities of wells can differ with respect to one or more properties affecting the performance of an assay, e.g., a biochemical assay or a cell-based assay, such as an optical property, geometry or shape, dimension, surface property, or assay reagent content. Typically, the properties of each of the different pluralities of wells are selected to improve the performance of a specific assay format (e.g., homogeneous, heterogeneous, biochemical, cell-based, and the like), or of an assay of a given format for a specific analyte (e.g., a high-abundance and a low-abundance analyte).

In embodiments, a multiwell plate is a circular multiwell plate comprising one or more pluralities of wells. In some embodiments, the circular multiwell plate includes two or more different pluralities of wells. In some embodiments, the pluralities of wells on the multiwell plate are arranged in concentric circles around the center of the plate. In some embodiments, the pluralities of wells are organized in a spokes-like arrangement pointing from the center of the circular multiwell plate to the periphery.

Exemplary assays that can be performed in the multiwell plates described herein and multiwell properties affecting such assays are described, e.g., in Taosheng Chen, A Practical Guide To Assay Development and High-Throughput Screening in Drug Discovery, CRC Press, 1.sup.st ed., 2009; Lisa K. Minor, Handbook of Assay Development in Drug Discovery, CRC Press, 1.sup.st ed., 2006; Ge Wu, Assay Development, Wiley, 1.sup.st ed., 2010; Uma Prabhakar, Validation of Cell-based Assays in the GLP Setting, Wiley, 1.sup.st ed., 2008; Masood Kahn and John Findlay, Ligand-Binding Assays, Wiledy, 1.sup.st ed., 2009; David Wild, Immunoassays, Elsevier Science; 4.sup.th ed., 2013, and Benjamin Blass, Basic Principles of Drug Discovery and Development, Academic Press, 1.sup.st ed., 2015, which are hereby incorporated herein by referenced in their entirety.

In some embodiments, a multiwell plate provided herein includes a plurality of wells configured for an absorbance-based assay and a different plurality of wells configured for a fluorescence-based assay. Wells configured for an absorbance-based assay can include, e.g., a clear or translucent bottom. Wells configured for a fluorescence-based assay can include, e.g., opaque (e.g., solid black or white) bottoms.

In some embodiments, a multiwell plate includes a plurality of wells configured for a heterogeneous assay (e.g., ELISA) and a different plurality of wells configured for a homogeneous assay (e.g., an enzymatic assay). Wells configured for a heterogeneous assay can, e.g., include a high-protein or high-nucleotide binding well surface. Wells configured for a homogeneous assay can include, e.g., a low-protein binding or low nucleotide-binding surface.

In some embodiments, a multiwell plate includes a plurality of wells configured for a cell-based assay (e.g., adherent cell or suspension cell-based assay) and a different plurality of wells configured for a biochemical assay (e.g., enzyme-substrate turnover assay). Wells configured for a cell-based assay can, e.g., be sterile or include a surface promoting cell attachment, cell differentiation, or cell proliferation (e.g., fibronectin coating). Wells configured for a biochemical assay can include, e.g., low-protein binding or low nucleotide-binding surfaces.

In some embodiments, a multiwell plate includes a plurality of wells configured for an assay analyzing a highly abundant analyte (e.g., blood glucose) and a different plurality of wells configured for an assay analyzing a low-abundance analyte (e.g., a cytokine). Wells configured for an assay analyzing a highly abundant analyte can, e.g., include a reagent (e.g., a dried reagent) for an assay having a high limit of detection. Wells configured for an assay analyzing a low-abundance analyte can, e.g., include a reagent (e.g., a dried reagent) for an assay having a low limit of detection.

In some embodiments, the multiwell plate includes one or more pluralities of wells configured for an absorbance based assay and one or more different pluralities of wells configured for a fluorescence based assay. In some embodiments, one or more pluralities of wells configured for the absorbance based assay are arranged in a circle of wells on the periphery of a circular (e.g., disk shaped) multiwell plate. In some embodiments, the wells arranged on the periphery of a circular multiwell plate have a diameter of between 0.5 mm and 3.0 mm (e.g., 1.5 mm). In some embodiments, the wells arranged on the periphery of the circular multiwell plate include between about 1 to 8, 12, 24 or 48 wells, or between about 36 to 48 wells. In some embodiments, the one or more pluralities of wells configured for an absorbance based assay include one or more pluralities of wells configured for a cell-based assay (e.g., RBC assay). In some embodiments, the one or more pluralities of wells configured for an absorbance based assay include one or more pluralities of wells configured for a biochemical assay. In some embodiments, the one or more pluralities of wells configured for a biochemical assay include one or more pluralities of wells configured for a homogeneous assay (e.g., protein detection, such as general protein absorbance (280 nm) or hemoglobin absorbance 540 nm-600 nm range (e.g., hemoglobin, oxyhemoglobin, carboxyhemoglobin, methemoglobin)). In some embodiments, the one or more pluralities of wells configured for a biochemical assay include one or more pluralities of wells configured for a heterogeneous assay (e.g., ELISA). In some embodiments, the one or more pluralities of wells configured for a fluorescence-based assay include one or more pluralities of wells configured for a fluorescence-based cellular assay. In some embodiments, the fluorescence-based cellular assay can assay suspension cells, cells adhered to beads, or cells adhered to a well bottom. In some embodiments, the one or more pluralities of wells configured for a fluorescence-based assay include one or more pluralities of wells configured for a fluorescence-based biochemical assay. In some embodiments, the one or more pluralities of wells configured for a fluorescence-based biochemical assay include one or more pluralities of wells configured for a homogeneous fluorescence-based biochemical assay (e.g., an enzymatic substrate-turnover assay). In some embodiments, the one or more pluralities of wells configured for a fluorescence-based biochemical assay include one or more pluralities of wells configured for a heterogeneous fluorescence-based biochemical assay (e.g., ELISA). In some embodiments, the heterogeneous fluorescence-based biochemical assay involves analyte binding to a bead surface or well surface.

In some embodiments, the multiwell plate includes one or more pluralities of wells configured for a cell-based assay and one or more different pluralities of wells configured for a biochemical assay. In some embodiments, the one or more pluralities of wells configured for a cell-based assay include one or more pluralities of wells configured for a fluorescence-based cellular assay. In some embodiments, the fluorescence-based cellular assay can assay suspension cells or cells attached to the surface of a bead or well. In some embodiments, the one or more pluralities of wells configured for a cell-based assay include one or more pluralities of wells configured for an absorbance-based cellular assay. In some embodiments, the one or more pluralities of wells configured for a biochemical assay include one or more pluralities of wells configured for a homogeneous biochemical assay. In some embodiments, the one or more pluralities of wells configured for a homogeneous biochemical assay include one or more pluralities of wells configured for a homogeneous fluorescence-based biochemical assay. In some embodiments, the one or more pluralities of wells configured for a homogeneous biochemical assay include one or more pluralities of wells configured for a homogeneous absorbance-based biochemical assay. In some embodiments, one or more pluralities of wells configured for a biochemical assay include one or more pluralities of wells configured for a heterogeneous biochemical assay. In some embodiments, the plurality of wells configured for a heterogeneous biochemical assays include one or more pluralities of wells configured for a fluorescence-based heterogeneous biochemical assay. In some embodiments, the one or more pluralities of wells configured for a heterogeneous biochemical assay include one or more pluralities of wells configured for an absorbance-based heterogeneous biochemical assay. In some embodiments, one or more of the pluralities of wells configured for an absorbance based assay are arranged in a circle of wells on the periphery of a circular (e.g., disk shaped) multiwell plate. In some embodiments, the wells arranged on the periphery of a circular multiwell plate have a diameter of between about 0.5 mm and 3.0 mm (e.g., 1.5 mm). In some embodiments, the wells arranged on the periphery of the circular multiwell plate include between about 1 to 8, 12, 24 or 48 wells, or between about 36 to 48 wells.

In some embodiments, the multiwell plate includes two or more different pluralities of wells configured to analyze two or more analytes selected from a small molecule analyte (e.g., a monosaccharide, fatty acid, salt, drug), a large molecule analyte (e.g., a protein, phospholipid, nucleic acid), and a cell (e.g., a red blood cell, a white blood cell).

In some embodiments, the multiwell plate includes one or more pluralities of wells configured for an assay for detecting a cell (e.g., RBC, WBC, circulating cancer cell (CTC), bacterial cell), and one or more different pluralities of wells configured for an assay for detecting a large molecule analyte (e.g., a protein analyte). In some embodiments, the multiwell plate includes one or more pluralities of wells configured for an assay for detecting a cell (e.g., a RBC, a WBC, a circulating cancer cell (CTC), a bacterial cell), one or more different pluralities of wells configured for an assay for detecting a large molecule analyte (e.g., a protein analyte), and one or more different pluralities of wells configured for an assay for detecting a small molecule analyte (e.g., glucose or cholesterol).

In some embodiments, the multiwell plate includes one or more pluralities of wells configured for an assay for detecting a high abundance analyte (e.g., albumin, glucose or a RBC) and one or more different pluralities of wells configured for an assay for detecting a medium- or low-abundance analyte (e.g., tumor necrosis factor alpha (TNFcc) or a CTC).

In some embodiments, the multiwell plate has a circular shape (e.g., disc shape) or an ellipsoid shape. In some embodiments, the multiwell plate has a square or rectangular shape.

In some embodiments, one or more of the different pluralities of wells include one or more reagents for a biochemical assay. In some embodiments, the biochemical assay includes turnover of an enzyme substrate. In some embodiments, the biochemical assay includes binding of a binding reagent (e.g., antibody) to an analyte of interest (e.g., insulin, cytokine, or the like). In some embodiments, reagents for a biochemical assay include an enzyme or an enzyme substrate. In some embodiments, the enzyme substrate is a fluorescent substrate (i.e., a substrate that can change its fluorescence properties as a result of enzyme-mediated turnover). In some embodiments, the enzyme substrate can change its absorbance characteristics in the ultraviolet (e.g., 200 nm-400 nm) or visible spectrum (e.g., 350 nm-850 nm) as a result of enzyme-mediated turnover. In some embodiments, the biochemical assay is a binding assay (e.g., sandwich-immune assay, ELISA, or the like). In some embodiments, the biochemical assay is a competition assay (e.g., immunoassay for a steroid hormone). In some embodiments, the biochemical assay is a homogeneous assay (e.g., (TR-)FRET assay, enzyme-substrate turnover assay, or the like). In some embodiments, the biochemical assay is as heterogeneous assay (e.g., ELISA). In some embodiments, the biochemical assay is a kinetic assay (e.g., continuous-read or intermittent-read). In some embodiments, the biochemical assay is an endpoint assay. In some embodiments, the biochemical assay reagent is coated on the surface of a plurality of wells (e.g., a capture or binding reagents, such as an antibody, streptavidin, protein A, protein G, aptamer, oligonucleotide capture probe, or the like). In some embodiments, the biochemical assay reagent is a dried reagent (e.g., to facilitate long-term storage). In some embodiments, the biochemical assay reagent is in solution (e.g., dissolved in an aqueous buffer or an organic solvent).

In some embodiments, one or more of the different pluralities of wells include one or more reagents for a cell-based assay. In some embodiments, the cell-based assay includes binding of a binding reagent (e.g., a fluorescence-labeled antibody) to a cell-surface marker (e.g., CD20, CD45, or the like). In some embodiments, reagents for a cell-based assay include a labeled cell-specific binding reagent (e.g., a fluorescence-labeled anti-CD20 antibody) or a bead coated with a cell-specific binding reagent (e.g., an antibody directed to a cell-surface marker, e.g., anti-CD20 antibody). In some embodiments, reagents for a cell-based assay include a cell (e.g., mammalian, bacterial, yeast cell, or the like). In some embodiments, the cell is an adherent cell (e.g., a solid tumor-derived cell). In some embodiments, the cell is a suspension cell (e.g., red blood cell (RBC), white blood cell (WBC), circulating tumor cell (CTC), or the like). In some embodiments, the cell is a mammalian cell (e.g., a human, primate, hamster, mouse, rat and the like). In some embodiments, the cell is a yeast cell. In some embodiments, the cell is a bacterial cell (e.g., gram-positive or negative). In some embodiments, the cell is a recombinant cell. In some embodiments, the cell-based assay is a reporter gene-assay. In some embodiments, the reporter-gene is luciferase. In some embodiments, the cell-based assay is a cell-enumeration assay. In some embodiments, the cell-based assay reagent is a dried reagent (e.g., to facilitate long-term storage). In some embodiments, the cell-based assay reagent is in solution (e.g., dissolved in an aqueous buffer, organic solvent or a tissue culture medium).

In some embodiments, one or more of the different pluralities of wells include one or more reagents for a homogeneous assay. In some embodiments, the homogeneous assay is a biochemical assay. In some embodiments, the homogeneous assays is a cell-based assay using suspension cells.

In some embodiments, one or more of the different pluralities of wells include one or more reagents for a heterogeneous assay. In some embodiments, the reagents for a heterogeneous assay include a bead or a well surface with an immobilized analyte-specific binding reagent (e.g., a covalently bound or physically adsorbed antibody, biotin, or other binding reagent) or a soluble analyte specific binding reagent (e.g., a fluorescence-labeled or enzyme-conjugated antibody, biotin, or other binding reagent).

In some embodiments, a first plurality of wells include one or more reagents for a cell-based fluorescence assay (e.g., WBC enumeration). In some embodiments a first plurality of wells include one or more reagents for a cell-based fluorescence assay and a different second plurality of wells include one or more reagents for a fluorescence based biochemical assay (e.g., for blood glucose). In some embodiments, the fluorescence based biochemical assay is a homogeneous assay (e.g., for blood glucose). In some embodiments, the fluorescence based biochemical assay is a heterogeneous assay (e.g., for insulin, a cytokine, or the like). In some embodiments a first plurality of wells include one or more reagents for a cell-based fluorescence assay, a different second plurality of wells include one or more reagents for a fluorescence based biochemical assay and a different third plurality of wells include one or more reagents for an absorbance based biochemical assay. In some embodiments, one or more reagents are dried reagents.

In some embodiments, a first plurality of wells include one or more reagents for an absorbance based cellular assay (e.g., RBC enumeration). In some embodiments a first plurality of wells include one or more reagents for an absorbance based cellular assay (e.g., RBC enumeration) and a different second plurality of wells include one or more reagents for a fluorescence based biochemical assay (e.g., for blood glucose). In some embodiments, the fluorescence based biochemical assay is a homogeneous assay (e.g., for blood glucose). In some embodiments, the fluorescence based biochemical assay is a heterogeneous assay (e.g., for insulin, a cytokine, or the like). In some embodiments a first plurality of wells include one or more reagents for an absorbance based cellular assay, a different second plurality of wells include one or more reagents for a heterogeneous fluorescence based biochemical assay and a different third plurality of wells include one or more reagents for a homogeneous fluorescence based biochemical assay. In some embodiments, one or more reagents are dried reagents.

In some embodiments, a first plurality of wells include one or more reagents for an absorbance based biochemical assay. In some embodiments a first plurality of wells include one or more reagents for an absorbance based biochemical assay and a different second plurality of wells include one or more reagents for a fluorescence based biochemical assay. In some embodiments, the fluorescence based biochemical assay is a homogeneous assay. In some embodiments, the fluorescence based biochemical assay is a heterogeneous assay. In some embodiments a first plurality of wells include one or more reagents for an absorbance based biochemical assay, a different second plurality of wells include one or more reagents for a heterogeneous fluorescence based biochemical assay and a different third plurality of wells include one or more reagents for a homogeneous fluorescence based biochemical assay. In some embodiments, one or more reagents are dried reagents.

In some embodiments, a first plurality of wells include one or more reagents for a fluorescence based biochemical assay. In some embodiments a first plurality of wells include one or more reagents for a fluorescence based biochemical assay and a different second plurality of wells include one or more reagents for an absorbance based biochemical assay. In some embodiments, the absorbance based biochemical assay is a homogeneous assay. In some embodiments, the absorbance based biochemical assay is a heterogeneous assay. In some embodiments a first plurality of wells include one or more reagents for a fluorescence based biochemical assay, a different second plurality of wells include one or more reagents for a heterogeneous absorbance based biochemical assay and a different third plurality of wells include one or more reagents for a homogeneous absorbance based biochemical assay. In some embodiments, one or more reagents are dried reagents.

Kits

In another aspect, provided herein is a kit, comprising an assay device and optionally, one or more assay reagents, such as an assay buffer. In embodiments, the assay device is incorporated into a consumable support tray for a detection system. In such embodiments, the one or more reagents may be included in one or more wells of the consumable support tray. In embodiments, the consumable support tray may also include one or more disposable tools for performing an assay, such as one or more disposable pipette tips and the like. In some embodiments, the kit may also include a multiwell plate for use with a detection system.

In some embodiments, a kit may include one or more assay buffers (e.g., enzyme or substrate dilution buffer, stop solution, cell culture media, or the like) or diluents (e.g., water, phosphate buffer, dimethylsulfoxide (DMSO), ethanol, isobutanol, or the like). In some embodiments, the volume of an assay buffer or diluent packaged in the kit is between 10 μl and 10 ml, such as between 10 μl and 100 μl, between 100 μl and 500 μl, between 500 μl and 1 ml, between 1 ml and 2 ml, between 2 ml and 3 ml, between 3 ml and 4 ml, between 4 ml and 5 ml, between 5 ml and 6 ml, between 6 ml and 7 ml, between 7 ml and 8 ml, between 8 ml and 9 ml, or between 9 ml and 10 ml. In some embodiments, the one or more assay buffer or diluents disposed with a consumable support tray.

Methods of Analyte Detection

The methods of analyte detection provided herein generally involve the use of assay devices as described herein and optionally a multiwell plate, as well as the use of devices or systems described herein. The methods can be applied, e.g., in a DTC diagnostics application at a POCC site (e.g., in a pharmacy or a store), or in a clinical setting (e.g., in a clinical laboratory, in a hospital).

In another aspect, provided herein is a method for analyte detection, comprising performing an assay to detect one or more analytes of interest in a sample from a consumer in an assay device of the disclosure and optionally two or more different pluralities of wells of a multiwell plate to detect the different analytes. In some embodiments, the method includes verifying the consumer's identity. In some embodiments, the method includes presenting the consumer with a selection of analytes of interest for testing in the two or more different assays. In some embodiments, the method includes transferring the results of the two or more different assays to a data processing unit. In some embodiments, the method includes presenting the results of different assays to the consumer. In some embodiments, the method includes performing a quality control test on the sample from the consumer, and, if the sample fails the quality control test, requesting an additional sample from the consumer, discarding the sample, not performing an assay, or not reporting the results of an assays to the consumer.

In some embodiments, selecting an analyte to be analyzed in the sample, includes the consumer interacting with a consumer interface (e.g., a computer terminal, or a touchscreen), e.g., a consumer interface in a system provided herein. In some embodiments, selecting an analyte includes the consumer communicating the selection to a system operator (e.g., a medical technician), e.g., to the an operator of a system described herein.

In some embodiments, the consumer interacting with a consumer interface includes the consumer logging into a personal account. In some embodiments, the consumer's personal account can include personal information about the consumer. Such personal information can include, e.g., identifying information for the consumer (e.g., date and place of birth, residence address), payment information (e.g., credit card number), insurance information (e.g., health insurance), health information, genetic information (e.g., from a personal genomics service or from clinical testing), personal habits of the consumer (e.g., use of tobacco, alcohol, recreational drugs, nutraceuticals, prescription medication), and the like. Health information can include, e.g., information entered by the consumer (e.g., familial medical history), results from previous analyses of analytes, e.g., analyses performed on a system provided herein, information originating from a healthcare provider (e.g., imaging results). In some embodiments, the method includes the consumer entering the information into the personal account. In some embodiments, the method includes a third party (e.g., a healthcare provider or insurance company) entering information into the personal account. In some embodiments, the consumer can access the personal account at the POCC site. In some embodiments, the consumer can access the personal account over the internet, e.g., from his home.

In some embodiments, the consumer interface (e.g., computer terminal or touchscreen) is located at the POCC site (e.g., in a general store or pharmacy). In some embodiments, the consumer interface is internet-based. In some embodiments, the consumer interface is a mobile application, e.g., on a smart-phone or a tablet computer.

In some embodiments, the consumer interacting with a consumer interface includes the consumer entering personal information. In some embodiments, the personal information entered by the consumer includes identifying information, such as the consumer's name, date of birth, birthplace, residential address, driver license number, an answer to a security question, and or like. In some embodiments, the consumer interacting with a consumer interface includes verifying the identity of the consumer. In some embodiments verifying the consumer's identity includes analyzing the consumer's fingerprint or scanning the consumer's retina. In some embodiments, the consumer can enter the personal information at the POCC site. In some embodiments, the consumer can enter the information over the internet, e.g., from his home or on the go, using a mobile application (e.g., on a smartphone or tablet computer).

In some embodiments, verifying the consumer's identity includes voice recognition. In some embodiments, verifying the consumer's identity includes facial recognition technology.

In some embodiments, presenting the consumer with a selection of analytes of interest for testing includes displaying the selection to the consumer via a consumer interface, e.g., on a screen, such as a computer monitor, or the screen of a tablet or mobile device (e.g., smartphone).

In some embodiments, the analytes include 1 or more, 2 or more, 3 or more, 4 or more, 5 or more, 6 or more, 7 or more, 8 or more, 9 or more, 10 or more, 12 or more, 15 or more, 20 or more, 25 or more, 30 or more, 35 or more, 40 or more, 45 or more, or 50 or more different analytes.

In some embodiments, the method includes storing an assay device in a storage unit connected to a detection system described herein. In some embodiments, the method includes transferring a prepackaged assay device from a storage facility (e.g., a warehouse or a storage cabinet) onto a detection system.

In some embodiments, the method includes reading a marker (e.g., one or two-dimensional barcode, QR code, or RFID tag) on an assay device, e.g., using a barcode reader.

In some embodiments, the method includes a step of collecting a sample from a consumer. In some embodiments, the sample is collected in a sample container.

In some embodiments, the sample container is a sterile container or pod. In some embodiments, the sample container is placed onto the detection system by a skilled technician.

In some embodiments, the method includes optionally performing a quality control test on the sample, wherein, if the sample passes the quality control test, the sample is analyzed for analytes interest to the consumer, and, if the sample fails the quality control step, the sample is discarded, the analytes of interest are not analyzed, or the results of the analysis of the analytes of interest are not reported to the consumer. In some embodiments, the quality control test is performed prior to the analysis of analytes of interest to the consumer. In some embodiments, the quality control analysis is performed parallel to the analysis of analytes of interest to the consumer.

In some embodiments, the sample is a blood sample. In some embodiments, the blood sample is fingerprick blood. In some embodiments, the blood sample volume is between about 15 µl and about 150 µl, between about 20 µl and about 125 µl, between about 25 µl and about 100 µl, or between about 50 µl and about 70 µl. In some embodiments the blood sample volume is about 10 µl, about 15 µl, about 20 µl, about 25 µl, about 30 µl, about 35 µl, about 40 µl, about 45 µl, about 50 µl, about 55 µl, about 60 µl, about 65 µl, about 70 µl, about 75 µl, about 80 µl, about µl, about 90 µl, about 95 µl, about 95 µl, or about 100 µl. In some embodiments, the blood sample volume is between about 50 µl and about 100 µl. In some embodiments, the blood sample volume is about 55 µl. Devices and methods for collecting fingerprick blood are known in the art. Exemplary devices useful for collecting fingerprick blood can include, e.g., devices by Seventh Sense Biosystems (e.g., using TAP Touch-Activated Phlebotomy™ or HemoLink™ technology). In some embodiments, fingerprick blood collected from a consumer includes less than 20%, less than 15%, less than 10%, less than 5%, less than 3%, less than 2%, or less than 1% interstitial fluid. In some embodiments, fingerprick blood collected from the consumer includes at least 80%, at least 85%, at least 90%, at least 95%, at least 97%, at least 98%, or at least 99% venous blood. In some embodiments, interstitial fluid is not detectable in fingerprick blood collected from the consumer.

In some embodiments, the blood sample is obtained by venipuncture (e.g., using a needle). In some embodiments, the blood sample is collected by a phlebotomist. In some embodiments the blood sample is collected with an evacuated tube or a vacuum tube (e.g., Vacutainer® by Becton Dickinson & Co, Vacuette® by Greiner Bio-One GmbH). In some embodiments, the blood sample is between about 1 ml and about 50 ml, between about 5 ml and about 30 ml and between about 10 ml and about 20 ml. In some embodiments, the blood sample is about 15 ml. In some embodiments, the blood sample is an aliquot from a larger sample, e.g., an aliquot between about 1 µl and about 250 µl, between about 5 µl and about 200 µl, between about 10 µl and about 175 µl, between about 15 µl and about 150 µl, between about 20 µl and about 125 µl, between about 25 µl and about 100 µl, or between about 50 µl and about 70 µl. In some embodiments, the aliquot is between about 1 µl and about 10 µl. In some embodiments, the aliquot is between about 50 picoliter (50 µl) and about 100 nanoliter (100 nl).

In some embodiments, the quality control step includes determining the ratio of venous blood and interstitial fluid in the fingerprick blood. In some embodiments, the fingerprick blood sample fails the quality control step if the sample includes more than 1%, more than 3%, more than 5%, more than 10%, more than 20%, more than 25%, or more than 30% of interstitial fluid.

In some embodiments, the quality control step includes comparing the level of a quality control analyte in two or more independent samples from a consumer. In some embodiments, the two or more independent samples from the consumer include two or more successive drops of fingerprick blood (e.g., 2, 3, 4, 5, 6, 7, 8, 9, or 10 successive drops). In some embodiments, the sample fails the quality control step if the average percent coefficient of variation (CV) of the quality control analyte for two or more independent samples from the consumer is more than 1%, more than 1.5%, more than 2%, more than 2.5%, more than 3%, more than 3.5%, more than 4%, more than 4.5%, more than 5%, more than 5.5%, more than 6%, more than 6.5%, more than 7%, more than 7.5%, more than 8%, more than 8.5%, more than 9%, more than 9.5, or more than 10%.

In some embodiments, the quality control test includes determining the drop-to-drop variation of a component of fingerprick blood. In some embodiments, the component of fingerprick blood includes hemoglobin concentration, total white blood cell (WBC) count, three-part WBC differential or platelet count. In some embodiments, the quality control test fails if the coefficient of variation (CV) in two or more successive drops of finger prick blood is greater than 1%, greater than 2%, greater than 3%, greater than 4%, greater than 5%, greater than 6%, greater than 7%, greater than 8%, greater than 9%, or greater than 10%. In some embodiments, the two or more successive drops of fingerprick blood are 2, 3, 4, 5, 6, 7, 8, 9, or 10 successive drops of fingerprick blood.

In some embodiments, the quality control step includes comparing the level of a quality control analyte in a sample from the consumer to a reference level. In some embodiments, the reference level is the median, mean, or average level of the quality control analyte in a healthy consumer. In some embodiments, the reference level is the median, mean, or average level of the quality control analyte in a consumer sharing one or more disease conditions with the consumer whose sample is tested. In some embodiments, the reference level is the median, mean or average level of the quality control analyte of all consumers whose quality control analyte levels are recorded in a database (e.g., a database associated with a DTC diagnostics system or device). In some embodiments, the reference level is a historical median, mean, or average level of the quality control analyte previously recorded over a period of time for the consumer whose sample is tested. In some embodiments, the period of time is a period of at least 2 weeks, at least 1 month, at least 6 weeks, at least 2 months, at least 3 months, at least 6 months, at least 9 months, at least 12 months, at least 18 months, at least 2 years, or at least 3 years. In some embodiments, the sample fails the quality control step if the level of the quality control analyte in the sample from the consumer deviates from the reference level by at least 1.5, at least 2, at least 2.5, at least 3, at least 3.5, at least 4, at least 4.5, or at least 5 standard deviations of the mean, median, or average reference level. In some embodiments, the sample fails the quality control step if the level of the quality control analyte in the sample from the consumer is at least 10%, at least 20%, at least 30%, at least 40%, at least 50%, at least 60%, at least 70%, at least 80%, at least 90%, at least 100%, at least 200%, at least 300%, at least 400%, at least 500%, at least 600%, at least 700%, at least 800%, at least 900%, or at least 1,000% higher than the reference value. In some embodiments, the sample fails the quality control step if the level of the quality control analyte in the sample from the consumer is at least 10%, at least 20%, at least 30%, at least 40%, or at least 50% lower than the reference value.

The quality control analyte can be any analyte detectable in a sample from the consumer to be analyzed for the analytes of interest to the consumer. In some embodiments, the quality control analyte includes, e.g., hemoglobin, WBC count, lymphocyte count, granulocyte count, platelet count, or one or more analytes of interest to the consumer.

In some embodiments, performing a quality control test on a sample includes measuring the sample volume. In some embodiments, a sample passes the quality control test if the sample volume is equal to or exceeds a predetermined minimum sample volume. In some embodiments, the predetermined minimum sample volume is 1 µl, 2 µl, 3 µl, 4 µl, 5 µl, 6 µl, 7 µl, 9 µl, 10 µl, 12 µl, 15 µl, 20 µl, 25 µl, 30 µl, 35 µl, 40 µl, 45 µl, 50 µl, 75 µl or 100 µl.

In some embodiments, the method further includes centrifuging the sample.

In some embodiments the method further includes diluting the sample. In some embodiments, the sample is diluted in a multiwell plate provided herein. In some embodiments, the sample is diluted and transferred to an assay device provided herein. In some embodiments, diluting the sample includes preparing a serial dilution of the sample. In some embodiments, sample dilutions are prepared, e.g., using a piezoelectric or an acoustic liquid handling device (e.g., Labcyte Echo®).

In some embodiments, diluting the sample includes preparing a serial dilution of the sample. In some embodiments, the serial dilution includes a serial 2-fold, 3-fold, 5-fold or 10-fold dilution, such as serial 2-point, 3-point, 4-point, 5-point, 6-point, 7-point, 8-point, 9-point, 10-point, 11-point or 12-point dilution. In some embodiments, the sample is not diluted serially, e.g., a sample dilution series can include a 1:3, 1:5, 1:10, 1:100, and a 1:500 dilution of sample. In some embodiments, the dilution factors or numbers of dilutions in a dilution series are dependent on which two or more analytes of interest to the consumer are selected.

In some embodiments, an assay performed on an assay device provided herein includes adding sample (e.g., an aliquot of a sample dilution) to a well comprising a dried assay reagent (e.g., a reaction buffer component, an enzyme, an enzyme substrate, an antibody, a cell). In some embodiments, one or more assays performed on the assay device include adding a reaction buffer to a well of the system comprising a dried reagent, e.g., to resuspend the dried reagent.

In some embodiments, an assay performed using an assay device must meet minimum assay performance standards. In some embodiments, the Z-factor for each of the two or more different assays (e.g., 2, 3, 4, 5, 6, 7, 8, 9, 10, or more different assays) is >0.5, >0.6, >0.7, >0.8, or >0.9. A method for determining the Z-factor of an assay is described, e.g., in Zhang J H, et al. (1999). "A simple statistical parameter for use in evaluation and validation of high throughput screening assays". Journal of Biomolecular Screening 4: 67-73. In some embodiments, the CV values of positive and negative control wells on the multiwell plate for each of the two or more different assays are <10%, <9%, <8%, <7%, <6%, <5%, <4%, <3%, <2%, or <1%.

In some embodiments, the methods provided herein further include reporting assay results to the consumer. In some embodiments, the results are reported at the POCC site (e.g., in a general store or a pharmacy), e.g., at a computer terminal. In some embodiments, the results are made available to the consumer through the consumer's personal account (e.g., a consumer can log on to the personal account and view the results). In some embodiments, the results can be accessed by the consumer via the internet, e.g., on the consumer's personal computer or through a smartphone or tablet computer application.

In some embodiments, reporting assay results to the consumer includes providing a comparison of results obtained on a certain day with historical results to facilitate the tracking of results over time. In some embodiments, reporting assay results to the consumer includes providing comparative data to the consumer to put the consumer's assay results (e.g., analyte levels) into perspective relative to the results of other consumers, e.g., of the same age, from the same geographic region, or sharing similar habits with the consumer.

In some embodiments, reporting assay results to the consumer includes providing a recommendation to the consumer (e.g., provided by a computer algorithm). In some embodiments, the recommendation includes options for a medical treatment (e.g., a referral to a doctor), dietary changes (e.g., foods, recipes), product recommendations (e.g., nutraceuticals, vitamins, etc.) behavioral changes (e.g., exercise, smoking cessation).

In some embodiments, the methods provided herein include storing assay results of all consumers obtained with a method provided herein in a database (e.g., as anonymized data).

In some embodiments, the methods provided herein do not include a sample storage step, e.g., such as a freeze-thaw step.

In some embodiments, the methods provided herein include a seamless integration of sample collection from the patient (e.g., fingerprick) to sample preparation (e.g., centrifugation, bulk sample dilution, dispensing of sample into multiwell plate), sample testing (e.g., start of biochemical or cell-based assays in multiwell plate) and the reporting of test results to the consumer. In some embodiments, sample preparation begins within 60 min, within 45 min, within 30 min, within 20 min, within 15 min, within 10 min, within 5 min, within 3 min, or within 1 min following sample collection. In some embodiments, sample testing in a multiwell plate (e.g., a traditional plate or a multiwell plate provided herein) begins within 60 min, within 45 min, within 30 min, within 20 min, within 15 min, within 10 min, within 5 min, within 3 min, or within 1 min following sample collection. In some embodiments, sample testing begins within 60 min, within 45 min, within 30 min, within 20 min, within 15 min, within 10 min, or within 5 min following sample collection. In some embodiments, sample testing is completed within 12 hrs, within 10 hrs, within 8 hrs, within 6 hrs, within 4 hrs, within 3 hrs, within 2 hrs, within 90 min, within 60 minutes, within 45 min, within 30 min, or within 20 min following sample collection. In some embodiments, test results are communicated to the customer (e.g., by email) or accessible in a database within 12 hrs, within 10 hrs, within 8 hrs, within 6 hrs, within 4 hrs, within 3 hrs, within 2 hrs, within 90 min, within 60 minutes, within 45 min, within 30 min, or within 20 min from sample collection.

Samples

In some embodiments, the sample is a biological sample obtained from a subject, also referred to as a consumer. In some embodiments, the biological sample is a liquid sample. In some embodiments, the liquid sample is a blood sample (e.g., whole blood, plasma, or serum), a urine sample, or any other body fluid (e.g., amniotic fluid, bile, breast milk, cerebrospinal fluid, gastric acid, lymph, mucus (e.g., nasal drainage or phlegm), pericardial fluid, peritoneal fluid, pleural fluid, pus, rheum, saliva, semen, sputum, synovial fluid, sweat, tears, vaginal secretion, vomit, and the like).

The sample can be obtained non-invasively or invasively. Invasive sample collection can include, e.g., sample collection using an intravenous or hypodermic needle. In some embodiments, the sample can be obtained by fingerprick using a fingerprick device. Fingerprick devices that can be used in the methods provided herein include, without limitation, a TAP Touch Activated Phlebotomy™ device by Seventh Sense Biosystems or a HemoLink™ device by Tasso, Inc.

In some embodiments, the consumer is a healthy human. In some embodiments, the healthy human is a member of a normal control group in a clinical trial.

In some embodiments, the consumer has certain habits or traits, such as smoking, diet (e.g., western diet, Mediterranean diet, and the like), work-related (workaholic, nightshifts), exercise (e.g., frequent, infrequent, cardio, muscle mass, and the like), genetic predisposition (e.g., to depression, diabetes, and the like).

In some embodiments, the consumer is a human patient having a disease, disorder, or other condition (e.g., a metabolic disease, a genetic disorder, an inflammatory disease, an autoimmune disease, a neurodegenerative disorder, a psychiatric disorder and the like).

In some embodiments, the sample is a human blood sample. In some embodiments, the human blood sample is obtained using a fingerprick device.

Analytes

Analytes, or clinical parameters, that can be analyzed using the assay devices, multiwell plates, systems, or methods described herein can include analytes or clinical parameters related to a consumer's disease condition, a consumer's general health status, wellness or life-style, a consumer's genotype, or combinations thereof.

The analytes described herein can include any molecular or cellular component of a biological sample. In some embodiments, analytes include a protein (e.g., PSA), a nucleotide (e.g., an mRNA expression level or DNA sequence), a sugar (e.g., glucose, or a posttranslational protein modification), a lipid (e.g., triglycerides) or lipid particle (e.g., LDL, HDL, VLDL, and the like), a metabolite (e.g., lactate, pyruvate), a metal ion or mineral (e.g., Na+, Fe2+), a vitamin (e.g., ascorbic acid), a cell (e.g., white blood cell, platelet, virus, pathogen cell, such as a bacterium or a eukaryotic pathogen), or combinations thereof. Analytes can be analyzed qualitatively (e.g., presence or absence) or quantitatively (e.g., analyte concentration or number of analytes per volume). Analyte concentrations can be expressed in absolute terms (e.g., analyte concentration in a sample) or relatively (e.g., percent of a population).

In some embodiments, a consumer's disease condition can include, e.g., without limitation, a metabolic disorder (e.g. diabetes, obesity, metabolic syndrome, and the like), a liver disease (e.g., cirrhosis), a kidney disease (e.g., acute or chronic kidney disease, kidney cancer), a pancreas disease (e.g., acute pancreatitis, chronic pancreatitis, hereditary pancreatitis, pancreas cancer), an inflammatory disorder (e.g., rheumatoid arthritis, inflammatory bowel disease), a cardiovascular disorder (e.g., angina, myocardial infarction, stroke, atherosclerosis), an immune or autoimmune disorder (e.g., lupus erythematosus, celiac disease), a cancer (e.g., multiple myeloma, lymphoma, leukemia, prostate cancer, breast cancer, and the like), an infectious disease (e.g., Lyme Disease, HIV, sexually transmitted diseases (STDs), and the like), an endocrine disorder (e.g., Cushing's Syndrome, Growth Hormone Deficiency), a blood disorder (e.g., anemia, a bleeding disorder, such as hemophilia, or blood cancer), a psychiatric or behavioral disorder or condition (e.g., attention deficit disorder), and others.

In some embodiments, analytes or clinical parameters relating to a consumer's disease condition can include, e.g., without limitation, adenovirus DNA, alanine aminotransferase (ALT/SGPT), albumin, alkaline phosphatase (ALP), alpha-1-acid glycoprotein, alpha-1-antitrypsin (e.g., total), alpha-fetoprotein (AFP), amphetamines, amylase, red blood cell (RBC) antibody, antinuclear antibodies (ANA), apolipoprotein (e.g., apo A-1, apo B), aspartate aminotransferase (AST/SGOT), B-cell count, beta-2 microglobulin, bilirubin (e.g., direct or total), blood urea nitrogen (BUN), borrelia antibody, brain natriuretic peptide (BNP), calcitonin, calcium (e.g., blood, urine), cancer antigens (e.g., CA 125, CA 15-3, CA 27.29, CA 19-9), carbon dioxide, carcinoembryonic antigen (CEA), cardiolipin antibody (ACA, e.g., IgG), complete blood count (CBC), CD4 or CD8 counts (e.g., absolute counts or ratios), chlamydia tachomatis, chloride (e.g., blood, urine), cholesterol, cholinesterase, complement component 3 or 4 antigens, cortisol (e.g., total), C-peptide, C-reactive protein (CRP, e.g., CRP-High Sensitivity (hsCRP)), creatine kinase, creatinine (e.g., blood or urine), cyclic citrullinated peptide (CCP) antibody, IgG, cystatin C, cytomegalovirus (CMV) antibody (e.g., IgG or IgM), D-dimer, deamidated gliadin peptide (DGP) antibody (e.g., IgA or IgG), dehydroepiandrosterone sulfate (DHEA-5), deoxypyridinoline crosslinks (DPD) (collagen crosslinks, e.g., urine), double-stranded DNA (dsDNA) antibody (e.g., IgG), *E. coli* Shiga-like toxin, EBV early D Antigen (EA-D), EBV nuclear antibody, EBV viral capsid antigen (VCA), EBV viral capsid antigen (VCA), endomysial antibody (EMA, e.g., IgM or IgG), erythrocyte sedimentation rate (ESR/Sed Rate), extractable nuclear antigen antibodies (ENA panel) (RNP, Smith, SSA, SSB, SCO-70, JO-1), ferritin, fibrinogen, gastrin, glucose, growth hormone (HGH), *Helicobacter pylori* (*H. pylori*), IgG, hematocrit (HCT), hemoglobin (HGB), hemoglobin A1c (HbA1c), hepatitis A (HAV) antibody (e.g., IgM, total), hepatitis B (HBV) core antibody (e.g., IgM, total), hepatitis B (HBV) surface antibody (HBsAb; e.g., total), hepatitis B (HBV), DNA, hepatitis C (HCV) antibody, hepatitis C (HCV) genotype, hepatitis C (HCV), RNA, HER-2/neu, herpes simplex 1 (HSV1; e.g., IgG), herpes simplex 2 (HSV2; e.g., IgG), high-density lipoprotein (HDL), human immunodeficiency virus 1 (HIV-1; e.g., RNA), HIV-1/HIV-2 (e.g., antigen or antibody), homocysteine, immunoglobulins (e.g., IgA, IgG, IgM, IgE, IgG, IgM), IGF-1 (insulin-like growth factor 1), insulin, iron, iron binding capacity (IBC; e.g., total (TIBC)), lactate dehydrogenase, lead, lipase, low-density lipoprotein (LDL), lymphocyte enumeration, magnesium, measles, mumps, and rubella (MMR) immunity, microalbumin (e.g., urine), myoglobin, Neisseria gonorrhea (e.g., DNA), natural killer cells (NKC; e.g., total count), ova & parasites, parathyroid hormone (PTH), partial thromboplastin time (PTT), phosphorus, inorganic, platelets, potassium (e.g., blood, urine), prealbumin, prostate specific antigen (PSA, e.g., free or total), protein (total, e.g.; blood or urine), prothrombin pime (PT/INR), red blood cell count (RBC), reticulocyte count (RC), rheumatoid factor (e.g., total), rubella (Measles) antibody (e.g., IgG or IgM), sex hormone-binding globulin (SHBG), sodium (e.g., blood or urine), streptolysin O antibody (ASO; e.g., titer), T-cell (e.g., total count), triiodothyronine, thyroglobulin, thyroglobulin antibodies (TAA), thyroid peroxidase (TPO) antibody, thyroid stimulating hormone (TSH), thyroxine binding globulin (TBG), thyroxine (e.g., free T4 or total T4), tissue transglutaminase (tTG) antibody (e.g., IgA or IgG), toxoplasma (e.g., IgG or IgM), transferrin, triglycerides, triiodothyronine (e.g., free T3 or total T3), troponin I (tCNI), tuberculosis, uric acid, Varicella-zoster (VZV) antibody, and white blood cell count (WBC).

In some embodiments, a consumer's general health status, wellness or life-style can include or be affected by, e.g., without limitation, allergies/hypersensitivities, blood pressure, body weight (e.g., body-mass-index), diet (e.g., Western diet, Mediterranean diet, processed foods, home-cooked meals), drinking habits (e.g., frequency, quantity, or type of alcohol consumption), drug use (e.g., prescription drugs, recreational drugs, doping), environmental factors (e.g., pollution, climate), exercise habits (e.g., frequency, intensity, type of exercise), fertility, pregnancy, rest period (e.g., day or night-time, duration, frequency), smoking habits, stress levels (e.g., chronic, acute), vacation schedule, work schedule, and other factors.

In some embodiments, analytes or clinical parameters relating to a subject's general health status, wellness or life-style can include, e.g., without limitation, ACTH (corticotropin), alpha-fetoprotein (AFP; e.g., maternal), amphetamine, androstenedione, anti-mullerian hormone (AMH), apolipoprotein (e.g., apo A-1, apo B), barbiturates (e.g., urine), benzodiazepines (e.g., urine), cortisol (e.g., total), cyclosporine A, ecstasy (MDMA), estradiol, estriol (e.g., unconjugated), estrone, ethanol, folate (folic acid), follicle stimulating hormone (FSH), gamma-glutamyltransferase (GGT), glucose, hCG-chorionic gonadotropin (e.g., blood or urine, qualitative or quantitative), insulin, lithium, low-density lipoprotein (LDL), marijuana (THC), methadone (dolophine), methamphetamines, opiates, phencyclidine (PCP), progesterone, prolactin, propoxyphene, testosterone (e.g., free or total), tricyclic antidepressants (e.g., urine), vitamin B-12, vitamin D 25-OH.

In some embodiments, a subject's genotype can include genes related to a subject's health or disease conditions (e.g., life expectancy, disease susceptibility), or other physical or mental traits (e.g., energy level, athletic abilities, intelligence). In some embodiments, a subject's genotype can include genes related to a subject's ancestry (e.g., family ties, geographic origins).

In some embodiments, the analytes, or clinical parameters, that can be analyzed using the multiwell plates, systems, or methods described therein can include a biomarker (e.g., biomarker level in a patient) analyzed in connection with a pharmaceutical treatment of a patient, e.g., a small molecule drug or biotherapeutic (e.g., an antibody or other recombinant protein) treatment. In some embodiments, the biomarker is analyzed in the course of a clinical trial, e.g., to analyze the efficacy of an clinical drug candidate in a patient, to analyze a patient's compliance with the treatment regimen, or to select a patient who may benefit from the treatment. In some embodiments, the biomarker is analyzed in connection with a marketed therapy, such as a small molecule drug approved by the United States Food and Drug Administration, e.g., as a companion diagnostic.

Some analytes or clinical parameters analyzed using the methods, systems or devices described herein can relate to more than one categories including disease condition, general health status, wellness or life-style, and genotype. For example, a subject's blood glucose levels can relate to the subject's life-style (e.g., diet), the subject's disease condition (e.g., diabetes), or the subject's genotype (e.g., mutations in members of the insulin signaling pathway, such as the insulin receptor).

In some embodiments, analysis includes analysis of red blood cells (RBC; e.g., RBC count), platelets (e.g., platelet count), or white blood cells (WBC; e.g., WBC count). In some embodiments, the WBC includes the totality of WBCs in a blood sample (e.g., cluster of differentiation 45 (CD45)-positive cells, e.g., CD45RA-isotype or CD45RO-isotype; e.g., total WBC count). In some embodiments, the WBC includes a T-cell (e.g., cluster of differentiation 3 (CD3)-positive cells), a B-cell (e.g., cluster of differentiation 19 (CD19)-positive cells), a natural killer (NK) cell (e.g., CD3-negative and cluster of differentiation 16 (CD16) and cluster of differentiation 56 (CD56)-positive cells), or combinations thereof. In some embodiments, the T-cell includes a T-helper cell (e.g., CD4-positive cells) or a cytotoxic T-cell (e.g., CD8-positive cells). In some embodiments, T-helper cells or cytotoxic T-cells can be further classified into naive cells (e.g., CD4RA.sup.+ or CD8 RA.sup.+), or memory cells (e.g., CD4RO.sup.+ or CD8RO.sup.−). In some embodiments, the blood cell panel includes a circulating tumor cell (CTC; e.g., CTC count). In some embodiments, the CTC includes a traditional CTC (e.g., CD45-negative, creatin kinase (CK)-positive cell with intact nucleus), a cytokeratin negative (CK) CTC (e.g., CD45-negative cell with cancer cell-like morphology), a small CTC (e.g., a CD45-negative cell with a size and morphology similar to an average WBC), or a CTC cluster (e.g., two or more CTCs bound together, e.g., cluster of traditional, CK-negative or small CTCs). In some embodiments, the blood cell panel includes CD45 (e.g., CD45RA or CD45RO, or both), CD3, CD16, CD56, CD4, CD8, CK, cell morphology (e.g., cell size or shape, tumor cell-like or WBC-like phenotype or appearance, intact or apoptotic nucleus, and the like), or combinations thereof.

In some embodiments, analysis complete blood cell (CBC) analysis including white blood cell count (WBC), white blood cell differential (DIFF), absolute neutrophil count, % neutrophils (Neu, PMN, polys), absolute lymphocyte count, % lymphocytes (Lymph), absolute monocyte count, % monocytes (Mono), absolute eosinophil count, % eosinophils (EOS), absolute basophil count, % basophils (BASO), red blood count (RBC), red blood cell distribution (RDW), hemoglobin (Hb), hematocrit (Hct), mean corpuscular volume (MCV), mean corpuscular hemoglobin (MCH), mean corpuscular hemoglobin concentration (MCHC), platelet count (PIT), mean platelet volume (MPV), or combinations thereof.

Analytes, or clinical parameters, that can be analyzed using the multiwell plates, systems, or methods described therein can include analytes present at a wide range of different concentrations in a sample (e.g., a blood sample or urine sample). Analytes can include high-abundance analytes, medium-abundance analytes, and low-abundance analytes. In some embodiments, high-abundance analytes include analytes present in a sample at concentrations of >100 .mu.M, e.g., >500 .mu.M, >1 mM, >2 mM, >3 mM, >4 mM, >5 mM, >6 mM, >7 mM, >8 mM, >9 mM, >10 mM, >15 mM, >20 mM, >25 mM, >50 mM, >75 mM, >100 mM, >125 mM, >150 mM, or >200 mM. In some embodiments, medium abundance analytes include analytes present in a sample at concentrations between 100 nM and 100 μM (e.g., between 100 nM and 1 μM, between 1 μM and 10 μM, or between 10 μM and 100 μM). In some embodiments, low abundance analytes include analytes present in a sample at concentrations of <100 nM, such as <10 nM, <1 nM, <100 pM, <10 pM, or <1 pM.

Additional Uses

The systems and methods described herein can provide ready access to comprehensive diagnostic information for consumers, physicians and scientific researchers. By facilitating access to diagnostic testing the systems and methods described herein encourage consumers to repeatedly and frequently test health and wellness related analytes, thereby helping consumers and their physicians to make informed choices, e.g., regarding possible medical treatments options or lifestyle changes. Frequent diagnostic testing can also provide rapid feedback to consumers as to possible beneficial or harmful effects of new medical treatment regimens or of changes in their daily routines (e.g., diet, exercise) and can allow physicians to respond faster to changes in a patient's health condition, e.g., by adjusting medication.

For example, the systems and methods described herein can be useful to consumers interested in monitoring personal healthcare information. For example, a consumer may be interested in tracking the status of a chronic disease condition (e.g., diabetes or metabolic syndrome) or monitor the early effects of a new medical treatment. Such a consumer may be interested in testing a blood sample on a regular basis for a panel of metabolic analytes. The diagnostic results obtained using the systems and methods described herein can inform the consumer's decision on whether or when a doctor should be consulted.

Also, the systems and methods described herein can be useful to a consumer interested in general wellness related information. For example, a consumer may be interested in monitoring the effects of certain lifestyle choices on the consumer's general wellbeing (e.g., new diet, smoking cessation, new job, vacation, new exercise regimen, meditation, new partner). Such a consumer may be interested in testing a blood sample on a regular basis for an analyte panel including, e.g., stress hormones and other markers. The diagnostic results obtained using the systems and methods described herein can help guide the consumer towards steady improvements in the consumer's general wellbeing.

In some embodiments, the assay device, system and/or method of the disclosure is utilized to assess a disease or disorder in a subject and subsequently administer a therapeutic agent to the subject to treat the disease or disorder.

In some embodiments, the assay device, system and/or method of the disclosure is utilized to determine a risk of a disease or disorder in a subject and subsequently administer a therapeutic agent to the subject to inhibit the onset of and/or prevent the disease or disorder.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, while the current subject matter is described as being used in connection with point of care (POC) blood characterization systems, it will be appreciated that the devices described herein can be used with other types of POC systems. In addition, the current subject matter can be used with characterization of other types of liquid samples (e.g., other biological fluids, environmental testing samples, etc.). In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

Although the invention has been described with reference to the above examples, it will be understood that modifications and variations are encompassed within the spirit and scope of the invention. Accordingly, the invention is limited only by the following claims.

What is claimed is:

1. An assay device comprising:
a planar substrate having a top surface and a bottom surface;
a flow channel disposed within the planar substrate and extending along a dimension of the planar substrate between the top surface and the bottom surface and the flow channel having a volume of between about 30 to 90 microliters wherein the flow channel comprises a first sidewall portion and second sidewall portion, wherein the first sidewall portion extends from the inlet to the second sidewall portion, and wherein the first sidewall portion and the second sidewall portion are joined at an angle of between about 30° and 60°;
an inlet fluidly coupled to the flow channel; and
a vent fluidly coupled to the flow channel and operable to facilitate flow of a liquid sample through the flow channel, wherein the flow channel is configured to receive a liquid sample from the inlet and allow flow of the liquid sample within the flow channel whereby analytes of the liquid sample are distributed within the flow channel as a monolayer and the flow channel is configured to generate a substantially uniform distribution of red blood cells within an imaging area of the flow channel.

2. The assay device of claim 1, further comprising one or more additional flow channels disposed within the planar substrate.

3. The assay device of claim 2, wherein each of the one more additional flow channels is fluidly coupled to the inlet.

4. The assay device of claim 2, further comprising one or more additional inlets, wherein each of the one more additional flow channels is fluidly coupled to a separate inlet.

5. The assay device of claim 1, further comprising a cover that covers at least a first portion of the flow channel and does not cover at least a second portion of the flow channel.

6. The assay device of claim 1, wherein the bottom surface of the planar substrate is formed by a first material layer which defines a bottom surface of the flow channel and a sidewall surface of the flow channel, and the top surface of the planar surface is formed by a second material layer defining an upper surface of the flow channel.

7. The assay device of claim 1, wherein the bottom surface of the planar substrate is formed by a first material layer which defines a bottom surface of the flow channel, the top surface of the planar surface is formed by a second material layer defining an upper surface of the flow channel, and a third material layer interposed between the first and second material layers defines a sidewall surface of the flow channel wherein the first material layer, second material layer and third material layer are different.

8. The assay device of claim 1, the inlet disposed on the top surface of the planar substrate, the vent is disposed on the top surface of the planar substrate and configured to receive the liquid sample from the inlet and fill with the liquid sample.

9. The assay device of claim 1, further comprising a cover that covers at least a portion of an imaging area in the flow channel and does not cover the vent.

10. The assay device of claim 1, wherein the upper surface of the planar substrate disposed over the flow channel is transparent or semi-transparent.

11. The assay device of claim 1, wherein the bottom surface of the planar substrate is transparent or semi-transparent.

12. The assay device of claim 1, wherein the upper surface of the planar substrate disposed over the flow channel is not substantially autofluorescent, and the bottom surface of the planar substrate is not substantially autofluorescent.

13. The assay device of claim 1, wherein the inlet comprises a bevel feature operable to promote flow of liquid sample into the flow channel.

14. The assay device of claim 1, wherein the assay device is disposed in a consumable support pack.

15. The assay device of claim 1, wherein the flow channel and a cover in combination are configured to control a depth of the monolayer.

16. The assay device of claim 1, wherein a surface of the flow channel is texturized.

17. The assay device of claim 1, wherein a bottom surface, a top surface, a sidewall surface or any combination thereof, is hydrophilic.

18. The assay device of claim 1, wherein the flow channel is bordered by ridges that support a cover over the flow channel and the flow channel comprises posts that support the cover.

19. The assay device of claim 1, wherein the fluid sample is selected from the group consisting of amniotic fluid, aqueous humour, vitreous humour, blood, whole blood, fractionated blood, plasma, serum, breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, prostatic fluid, nipple aspirate fluid, lachrymal fluid, perspiration, cheek swabs, cell lysate, gastrointestinal fluid, biopsy tissue and urine.

20. The assay device of claim 19, wherein the liquid sample is whole blood.

21. The assay device of claim 1, wherein at least a portion of the monolayer has a uniform thickness, wherein the uniform thickness of the monolayer is confined by a bottom surface of the flow channel and an upper surface of the flow channel and is regulated by the bottom surface of the flow channel and the upper surface of the flow channel.

22. The assay device of claim 21, wherein the portion of the monolayer having a uniform thickness is uniform over a lateral area that is at least 1 square millimeter.

23. The assay device of claim 21, wherein the portion of the monolayer having a uniform thickness has a thickness uniformity of up to +/−5%.

24. A method of assembling an assay device of claim 1, the method comprising: forming in a planar substrate having a top surface and a bottom surface: a flow channel disposed within the planar substrate and extending along a dimension of the planar substrate between the top surface and the bottom surface; an inlet fluidly coupled to the flow channel; and a vent fluidly coupled to the channel and operable to facilitate flow of a liquid sample through the channel; and treating at least one surface of the flow channel to increase an amount of hydrophilicity of the at least one surface.

25. An assay device comprising:
a planar substrate having a top surface and a bottom surface;
a flow channel disposed within the planar substrate and extending along a dimension of the planar substrate between the top surface and the bottom surface and the flow channel having a volume of between about 30 to 90 microliters;
an inlet fluidly coupled to the flow channel;
a vent fluidly coupled to the flow channel and operable to facilitate flow of a liquid sample through the flow channel, wherein the flow channel is configured to receive a liquid sample from the inlet and allow flow of the liquid sample within the flow channel whereby analytes of the liquid sample are distributed within the flow channel as a monolayer and the flow channel is configured to generate a substantially uniform distribution of red blood cells within an imaging area of the flow channel; and further comprising one or more additional flow channels disposed within the planar substrate wherein each of the one more additional flow channels is fluidly coupled to the inlet wherein a first flow channel of the one more additional flow channels has a first depth, a second flow channel of the one more additional flow channels has a second depth wherein the first depth and second depth are different wherein the first flow channel comprises a first imaging area and the second flow channel comprises a second imaging area and the first flow channel and the second flow channel are configured for detection of the analytes within the first imaging area and second imaging area.

26. An assay device comprising:
a planar substrate having a top surface and a bottom surface;
a flow channel disposed within the planar substrate and extending along a dimension of the planar substrate between the top surface and the bottom surface and the flow channel having a volume of between about 30 to 90 microliters wherein the flow channel comprises a first sidewall portion and second sidewall portion, wherein the first sidewall portion extends from the inlet to the second sidewall portion, and wherein the first sidewall portion and the second sidewall portion are joined at an angle of between about 30° and 60°;
an inlet fluidly coupled to the flow channel;
a vent fluidly coupled to the flow channel and operable to facilitate flow of a liquid sample through the flow channel, wherein the flow channel is configured to receive a liquid sample from the inlet and allow flow of the liquid sample within the flow channel whereby analytes of the liquid sample are distributed within the flow channel as a monolayer and the flow channel is configured to generate a substantially uniform distribution of red blood cells within an imaging area of the flow channel; and
an upper surface disposed over the flow channel having a thickness of between about 0.05 to 0.5 millimeters.

* * * * *